(12) United States Patent
Kawaguchi et al.

(10) Patent No.: US 10,411,569 B2
(45) Date of Patent: Sep. 10, 2019

(54) ROTOR AND ROTOR MANUFACTURING METHOD

(71) Applicants: KYB Corporation, Tokyo (JP); TOP Co., Ltd., Echizen-shi, Fukui (JP)

(72) Inventors: Takayuki Kawaguchi, Kanagawa (JP); Tomomi Hayase, Gifu (JP); Ryuichi Kaneko, Gifu (JP); Yoshiteru Kurokawa, Kanagawa (JP); Hiroyuki Miyoshi, Fukui (JP); Akihiro Kawabata, Fukui (JP)

(73) Assignees: KYB Corporation, Tokyo (JP); TOP Co., Ltd., Echizen-shi, Fukui (JP)

( * ) Notice: Subject to any disclaimer, the term of this patent is extended or adjusted under 35 U.S.C. 154(b) by 249 days.

(21) Appl. No.: 15/516,688

(22) PCT Filed: Oct. 16, 2015

(86) PCT No.: PCT/JP2015/079247
§ 371 (c)(1),
(2) Date: Apr. 4, 2017

(87) PCT Pub. No.: WO2016/067932
PCT Pub. Date: May 6, 2016

(65) Prior Publication Data
US 2017/0302142 A1    Oct. 19, 2017

(30) Foreign Application Priority Data

Oct. 29, 2014 (JP) ................................. 2014-220715

(51) Int. Cl.
*H02K 15/03* (2006.01)
*H02K 1/27* (2006.01)

(52) U.S. Cl.
CPC ............. *H02K 15/03* (2013.01); *H02K 1/278* (2013.01)

(58) Field of Classification Search
CPC .............................. H02K 15/03; H02K 1/278
USPC ...................................................... 310/156.01
See application file for complete search history.

(56) References Cited

U.S. PATENT DOCUMENTS

| 4,918,802 A |   | 4/1990 | Schaefer | |
|---|---|---|---|---|
| 5,170,085 A | * | 12/1992 | Shinto | H02K 1/278 310/156.28 |
| 5,563,463 A |   | 10/1996 | Stark | |
| 6,047,461 A | * | 4/2000 | Miura | H02K 1/278 29/596 |

(Continued)

FOREIGN PATENT DOCUMENTS

| DE | 10314394 A1 | 10/2004 |
|---|---|---|
| JP | H02-231945 A | 9/1990 |

(Continued)

*Primary Examiner* — Alex W Mok
(74) *Attorney, Agent, or Firm* — Rabin & Berdo, P.C.

(57) ABSTRACT

A rotor manufacturing method for manufacturing a rotor including a rotor core, the rotor core having a permanent magnet mounted thereon throughout a circumferential direction, includes covering an outer circumference of the rotor core with a tubular rotor cover; and forming an angular portion conforming to an outer shape of the permanent magnet by pressing an open end of the rotor cover radially inward with use of a pressing member, the open end of the rotor cover axially projecting from an end of the rotor core before being pressed.

9 Claims, 24 Drawing Sheets

(56) References Cited

U.S. PATENT DOCUMENTS

| | | | |
|---|---|---|---|
| 7,741,747 B2 | 6/2010 | Yamamura et al. | |
| 8,598,762 B2 * | 12/2013 | Nakano | H02K 1/278 310/156.28 |
| 8,970,085 B2 * | 3/2015 | Takahashi | H02K 1/276 310/216.114 |
| 9,000,629 B2 * | 4/2015 | Yokogawa | H02K 1/278 310/43 |
| 9,653,953 B2 * | 5/2017 | Tanaka | H02K 1/2746 |
| 2010/0244607 A1 * | 9/2010 | Fujimoto | H02K 1/278 310/156.21 |
| 2013/0214620 A1 * | 8/2013 | Kobayashi | H02K 1/278 310/43 |

FOREIGN PATENT DOCUMENTS

| | | |
|---|---|---|
| JP | H11-299149 A | 10/1999 |
| JP | 2009-106065 A | 5/2009 |
| WO | WO-2000-014859 A1 | 3/2000 |

* cited by examiner

ROTOR AND ROTOR MANUFACTURING METHOD

TECHNICAL FIELD

The present invention relates to a rotor and a method of manufacturing the same.

BACKGROUND ART

JP 1999-299149A discloses a rotor used in a rotary electric machine. This rotor includes a yoke and covers. Magnets are mounted on the outer circumference of the yoke. The outer circumferential surfaces of the magnets are covered with the cover. Cutouts are formed in the circumferential ends of each magnet. Recesses are formed in an open edge of each cover. The recesses of the covers are each locked into opposing cutouts of neighboring magnets, thereby restricting axial and circumferential movements of the covers.

SUMMARY OF INVENTION

With the foregoing conventional technique, in order to circumferentially fix the covers with respect to the yoke, that is to say, in order to stop the rotation of the covers, the magnets and the covers need to be processed before covering the outer circumferences of the magnets with the covers. This complicates manufacturing processes.

An object of the present invention is to easily stop the rotation of a rotor cover.

According to one aspect of the present invention, a rotor manufacturing method for manufacturing a rotor including a rotor core, the rotor core being fixed to a rotation axis in such a manner that the rotor core is rotatable integrally with the rotation axis, and having a permanent magnet mounted thereon throughout a circumferential direction, includes covering an outer circumference of the rotor core with a tubular rotor cover; and forming an angular portion conforming to an outer shape of the permanent magnet by pressing an open end of the rotor cover radially inward with use of a pressing member, the open end of the rotor cover axially projecting from an end of the rotor core before being pressed.

DESCRIPTION OF EMBODIMENTS

The following describes embodiments of the present invention with reference to the attached drawings.

(First Embodiment)

Figure 1:
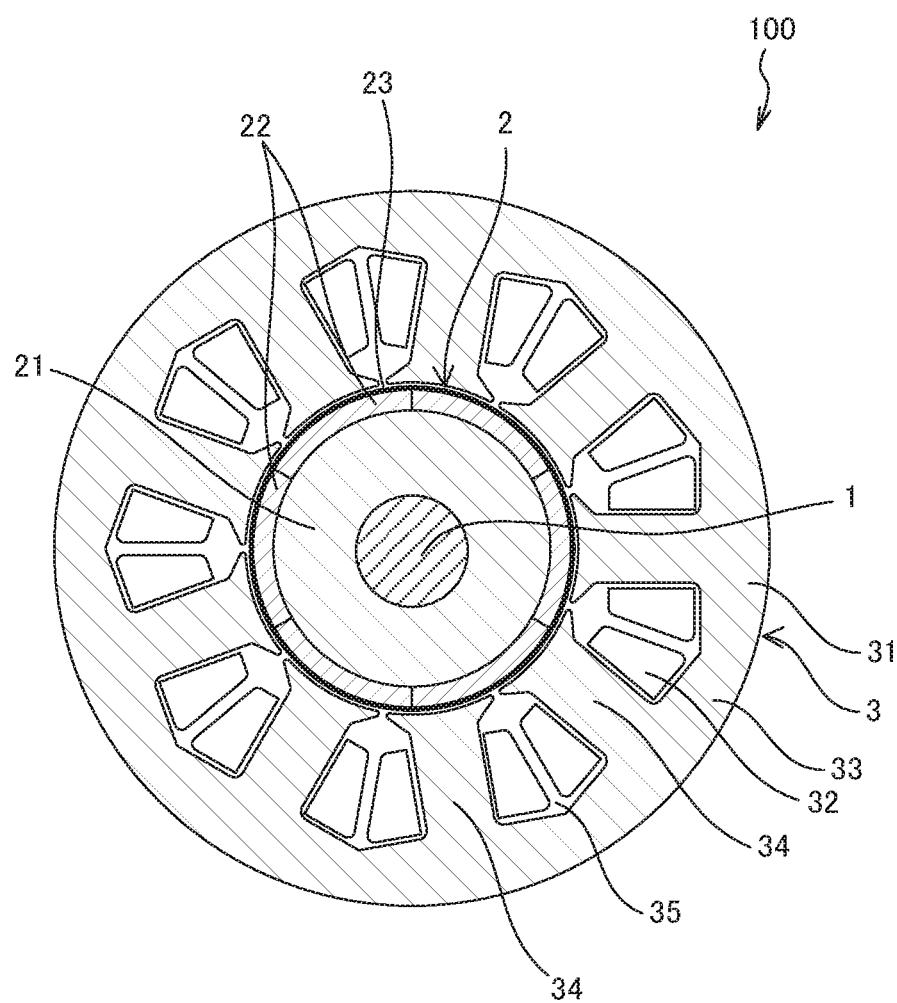
FIG. 1 is a cross-sectional view showing a rotary electric machine including a rotor according to a first embodiment of the present invention.

FIG. 1 is a cross-sectional view showing a cross-section of a rotary electric machine 100 including a rotor 2 according to a first embodiment, taken along a direction perpendicular to a rotation axis.

The rotary electric machine 100 functions as at least one of a motor and an electric generator. As shown in FIG. 1, the rotary electric machine 100 includes a rotatable shaft 1 serving as the rotation axis, the rotor 2 fixed integrally to the shaft 1, and a stator 3 opposing an outer circumference of the rotor 2 via a predetermined void.

The rotor 2 includes a rotor core 21, a plurality of permanent magnets 22, and a rotor cover 23. The rotor core 21 is fixed to an outer circumference of the shaft 1, and thus rotates together with the shaft 1. The permanent magnets 22 are arranged at an equal interval on an outer circumferential surface of the rotor core 21 throughout a circumferential direction. The rotor cover 23 houses the rotor core 21 on which the permanent magnets 22 have been mounted.

The rotor 2 includes six permanent magnets 22 that are circumferentially lined up. The rotor 2 is not limited in this way, and may include at least seven permanent magnets 22 or two to five permanent magnets 22 that are circumferentially lined up. Alternatively, the rotor 2 may include a ring-shaped permanent magnet 22 that is not divided in the circumferential direction.

Furthermore, the rotor 2 may include permanent magnets 22 that are separated from one another in an axial direction. In this case, the rotor 2 may have a so-called step-skew structure where circumferential gaps between the permanent magnets 22 are not aligned with one another in the axial direction.

The stator 3 includes a stator core 31 having a shape of a circular ring, and windings 32. The stator core 31 is disposed to encircle the rotor 2 in such a manner that a predetermined void is present between the rotor 2 and the stator core 31. The windings 32 are wound and mounted on the stator core 31.

The stator core 31 includes a ring-shaped yoke 33, a plurality of teeth 34, and slots 35. The teeth 34 project radially inward from the yoke 33, and are arranged at a predetermined interval in the circumferential direction. Each slot 35 is defined by neighboring teeth 34 so as to be located at the inner circumferential side of the yoke 33.

The windings 32 are wound around the teeth 34 of the stator core 31. Accordingly, a coil is formed on each tooth 34. The ends of the windings 32 are connected to an electrode (not shown) of the stator 3. When electric power is supplied to the coils via the electrode, the stator core 31 is magnetized, and the interaction between the stator core 31 and the permanent magnets 22 of the rotor 2 causes the rotor 2 to rotate with the shaft 1 serving as the axis.

Figure 2:
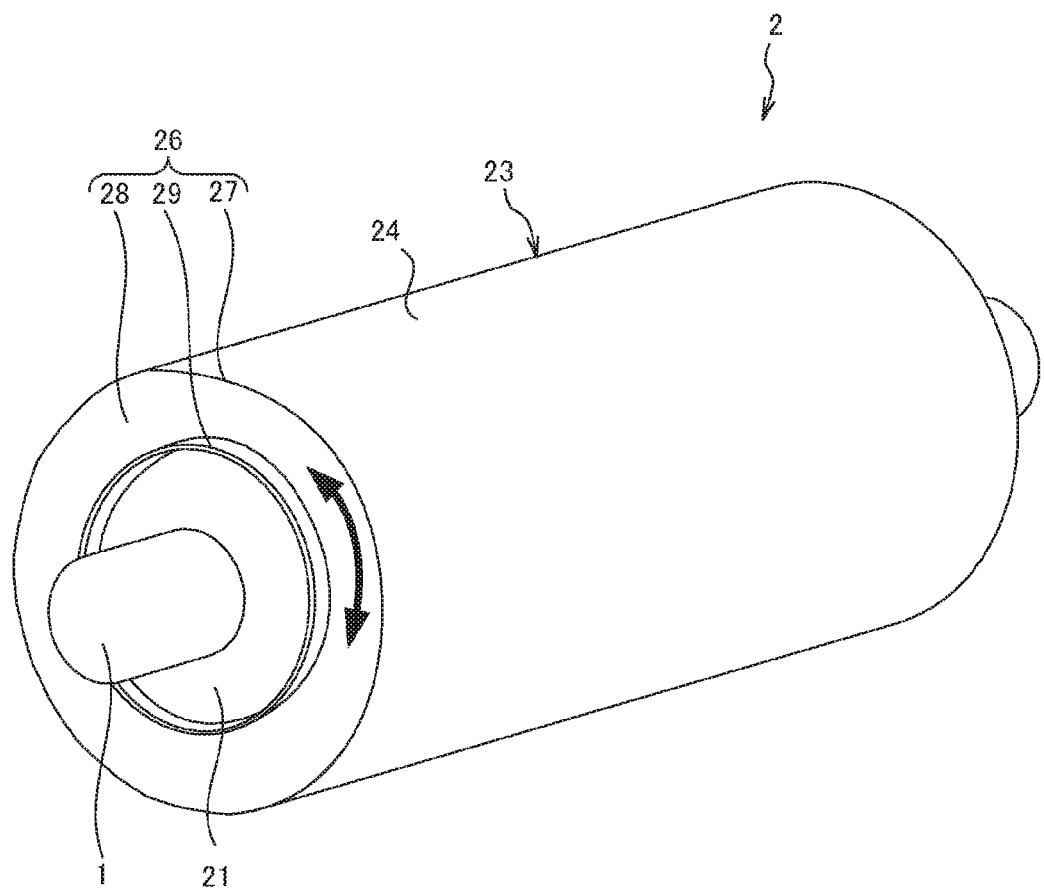
FIG. 2 is a perspective view showing the rotor according to the first embodiment of the present invention.
Figure 3:
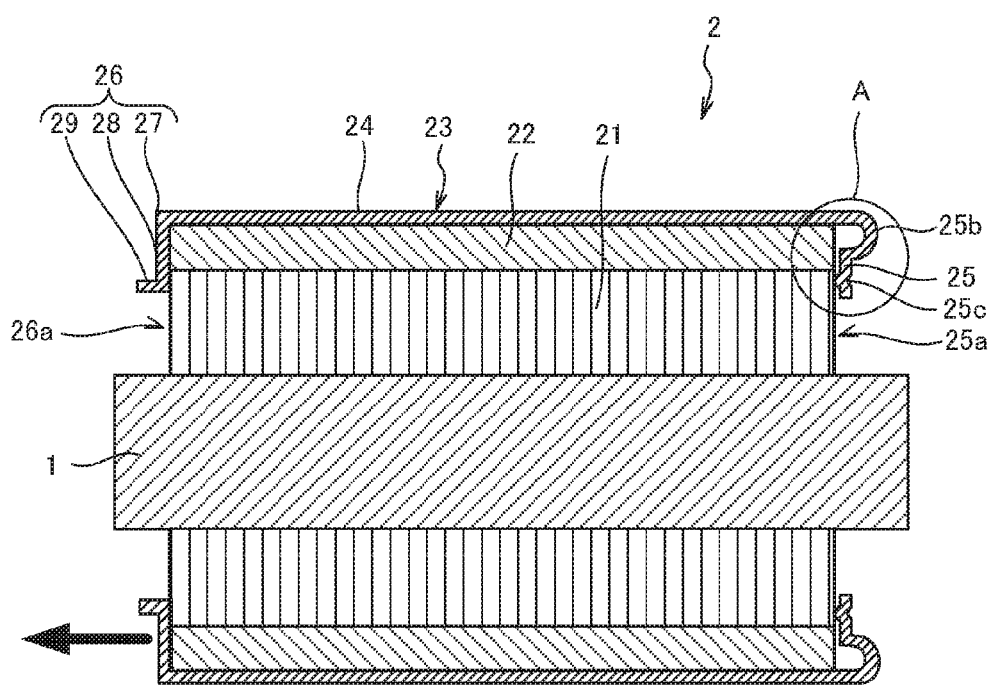
FIG. 3 is a cross-sectional view showing a cross-section of the rotor taken along a plane including a rotation axis of a shaft.

FIG. 2 is a perspective view showing the rotor 2 according to the present embodiment. FIG. 3 is a cross-sectional view showing a cross-section of the rotor 2 taken along a plane including the rotation axis of the shaft 1.

The rotor cover 23 is made of non-magnetic stainless steel, and formed into a shape of a tube with a bottom so as to house the rotor core 21 on which the permanent magnets 22 have been mounted. As shown in FIG. 3, the rotor cover 23 includes a tubular portion 24, a bottom portion 25, and an upper surface portion 26. The tubular portion 24 covers an outer circumference of the rotor core 21. The bottom portion 25 comes into contact with an end of the rotor core 21 at one axial side (the right side in FIG. 3). The upper surface portion 26 is bent with respect to the tubular portion 24, and comes into contact with an end of the rotor core 21 at the other axial side (the left side in FIG. 3).

As shown in FIG. 3, the bottom portion 25 is formed into a shape of a circular ring, and has a central hole 25a and a surface that is perpendicular to the axil direction. The hole 25a is larger in diameter than the shaft 1. An end of the tubular portion 24 and an outer circumferential end of the bottom portion 25 are connected via a projection 25b that axially projects from the end of the tubular portion 24.

Figure 4:
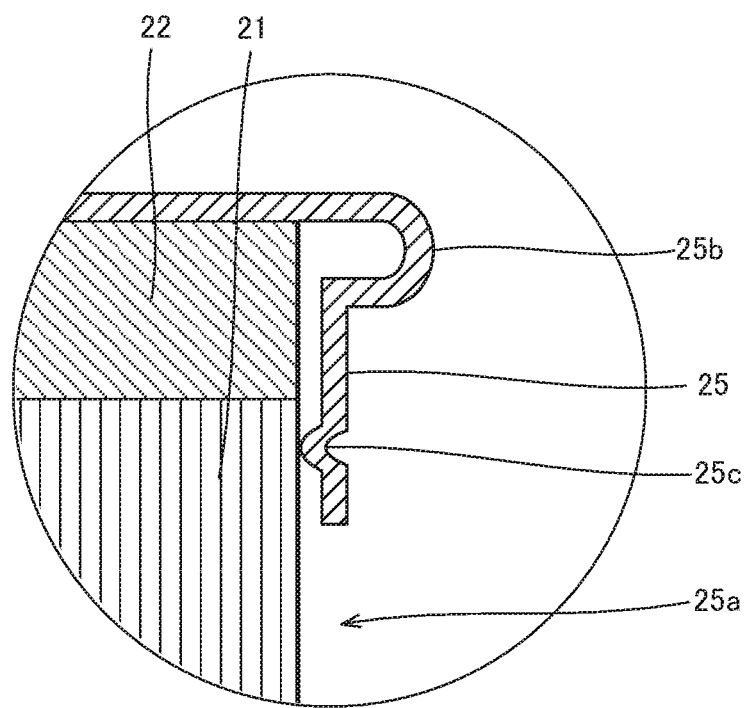
FIG. 4 is an enlarged view of section A in FIG. 3.

As shown in FIG. 4, in the rotor cover 23, a protrusion 25c is formed in the bottom portion 25 that opposes the rotor core 21. The protrusion 25c axially projects toward the inner side of the rotor cover 23. The rotor core 21 is clamped between the protrusion 25c of the bottom portion 25 and the upper surface portion 26. Any number of protrusions 25c may be formed in the bottom portion 25. The protrusion 25c may be formed into a shape of a dot, or a shape of a groove having predetermined dimensions in the radial and circumferential directions. That is to say, the protrusion 25c can be formed into any shape as long as it axially projects toward the inner side of the rotor cover 23 (the left side in FIG. 4).

The upper surface portion 26 includes an angular portion 27, a flange portion 28, and a boss portion 29. The angular portion 27 is formed in conformity to the outer shape of the plurality of permanent magnets 22. The flange portion 28 is formed into a shape of a circular ring, and has a central hole 26a and a surface that extends radially inward from the angular portion 27 and is perpendicular to the axial direction. The hole 26a is larger in diameter than the shaft 1. The boss portion 29 extends in the axial direction of the rotor core 21 from the radially inner side of the flange portion 28.

The upper surface portion 26 is formed by pressing an end of the tubular portion 24 at the other axial side radially inward. The angular portion 27 comes into contact with the permanent magnets 22 as it is formed in conformity to the outer shape of the permanent magnets 22. This contact enables the rotor cover 23 to circumferentially push the permanent magnets 22, thereby restricting relative rotations of the rotor cover 23 and the permanent magnets 22 in the circumferential direction. That is to say, the angular portion 27 functions as a detent that stops the rotation of the rotor cover 23 with respect to the rotor core 21.

An axial length of the boss portion 29 of the upper surface portion 26 is such that the boss portion 29 does not interfere with other components (not shown) of the rotary electric machine 100. In other words, there is a gap between the boss portion 29 and other components of the rotary electric machine 100. The upper surface portion 26 provided with the boss portion 29 has improved stiffness compared with the upper surface portion 26 provided with no boss portion 29. Therefore, after the upper surface portion 26 has been formed by pressing an open end of the tubular portion 24, springback of the upper surface portion 26 in the axial rise direction (the direction of an arrow in FIG. 3) and the circumferential direction (the direction of an arrow in FIG. 2) is reduced.

The hole 25a of the bottom portion 25 and the hole 26a of the upper surface portion 26 are smaller in diameter than the rotor core 21. The bottom portion 25 and the upper surface portion 26 extend to cover and hide the side surfaces of the permanent magnets 22.

A description is now given of a method of manufacturing the rotor 2 with reference to FIGS. 5 to 17.

First, the plurality of permanent magnets 22 are mounted on the outer circumferential surface of the rotor core 21. The permanent magnets 22 are mounted using an adhesive or the like so as to be arranged at an equal interval throughout the circumferential direction.

Figure 5:
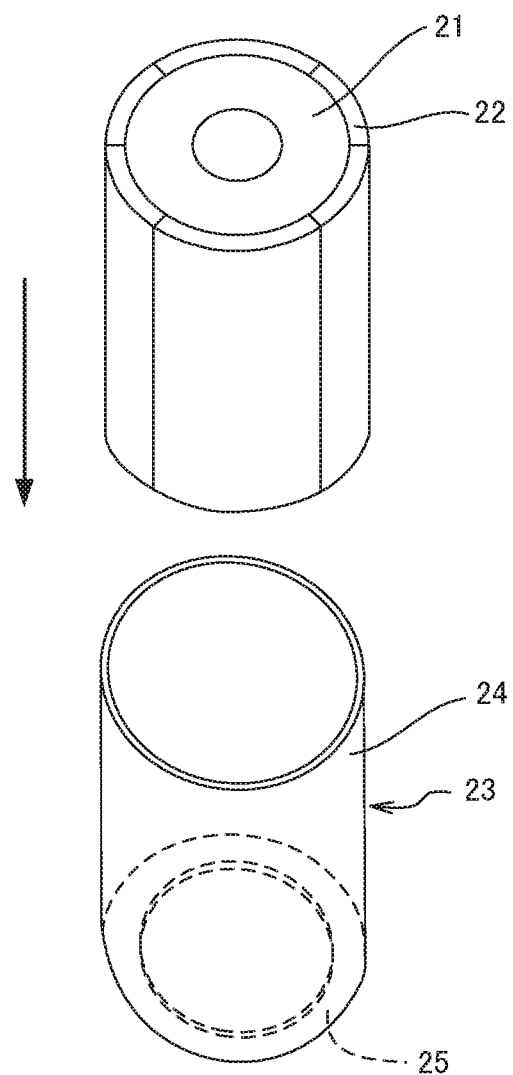
FIG. 5 is a perspective view illustrating rotor manufacturing processes, specifically, a process of making a rotor core housed in a rotor cover.
Figure 6:
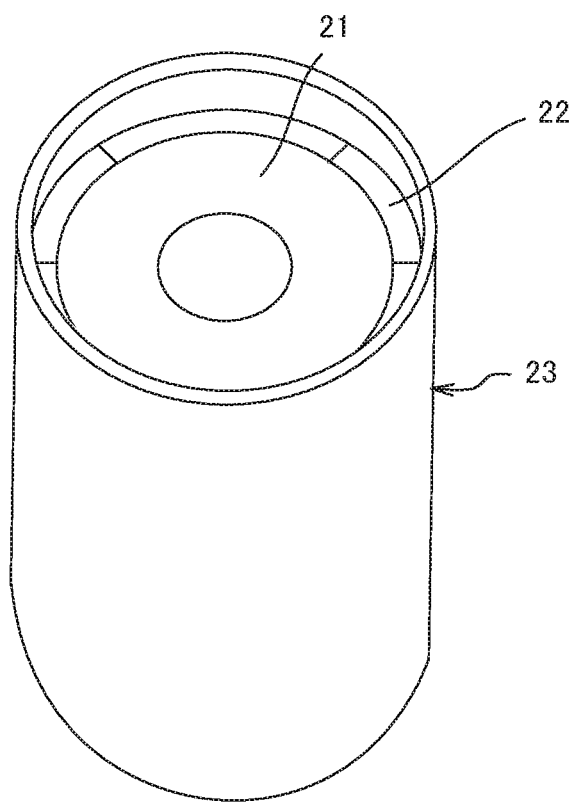
FIG. 6 is a perspective view illustrating the rotor manufacturing processes, specifically, a state where the rotor core is housed in the rotor cover.

Next, as shown in FIG. 5, the rotor core 21 on which the permanent magnets 22 have been mounted is inserted through an open end of the rotor cover 23 having the preformed bottom portion 25. Consequently, the rotor core 21 is housed in the rotor cover 23. At this stage, the upper surface portion 26 is not formed yet. Therefore, as shown in FIG. 6, once the rotor core 21 has been inserted to the point where it is in contact with the bottom portion 25 of the rotor cover 23, the open end of the rotor cover 23 is positioned above the upper end of the rotor core 21. Furthermore, at this stage, the protrusion 25c is not formed in the bottom portion 25.

Figure 7:
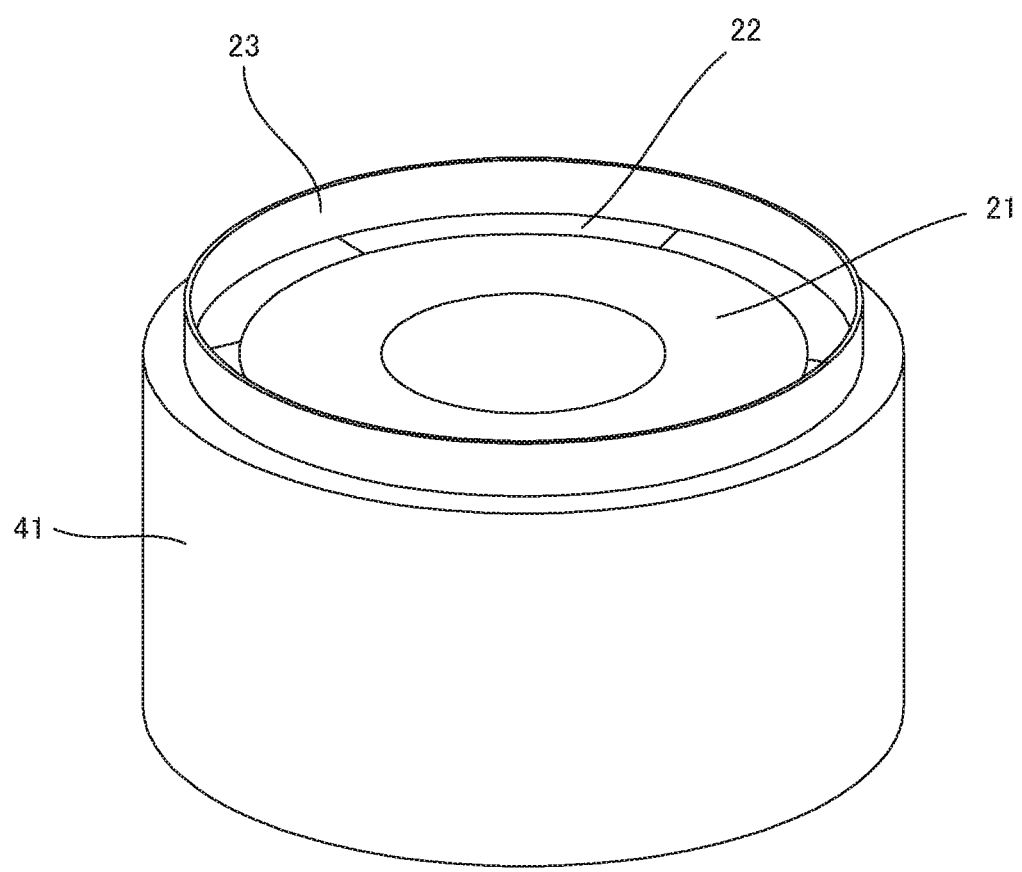
FIG. 7 is a perspective view illustrating the rotor manufacturing processes, specifically, the rotor core and the rotor cover housed in a restricting member.

Subsequently, as shown in FIG. 7, the rotor core 21 and the rotor cover 23 are housed in an external die 41 serving as a restricting member. The external die 41 is a tubular member whose inner diameter is substantially equal to the outer diameter of the tubular portion 24 of the rotor cover 23. The height of the external die 41 is substantially the same as the height of the rotor core 21. The external die 41 restricts radially outward bulging of the tubular portion 24 of the rotor cover 23 when the open end of the rotor cover 23 is pressed radially inward as will be described later.

Subsequently, a press process is performed in which the angular portion 27 is formed by pressing the open end of the rotor cover 23 radially inward with the use of a plurality of external collet segments serving as pressing members, and a plurality of internal collet segments serving as holding members. The press process includes a first press process and a second press process. In the first press process, the open end of the tubular portion 24 is pressed radially inward. In the second press process, the open end of the rotor cover 23 that was pushed radially inward in the first press process is further pressed radially inward. In the first press process, first external collet segments 42 are used as external collet segments, and first internal collet segments 43 are used as internal collet segments. On the other hand, in the second press process, second external collet segments 52 are used as external collet segments, and second internal collet segments 53 are used as internal collet segments. A specific description of the press process will now be given.

Figure 8:
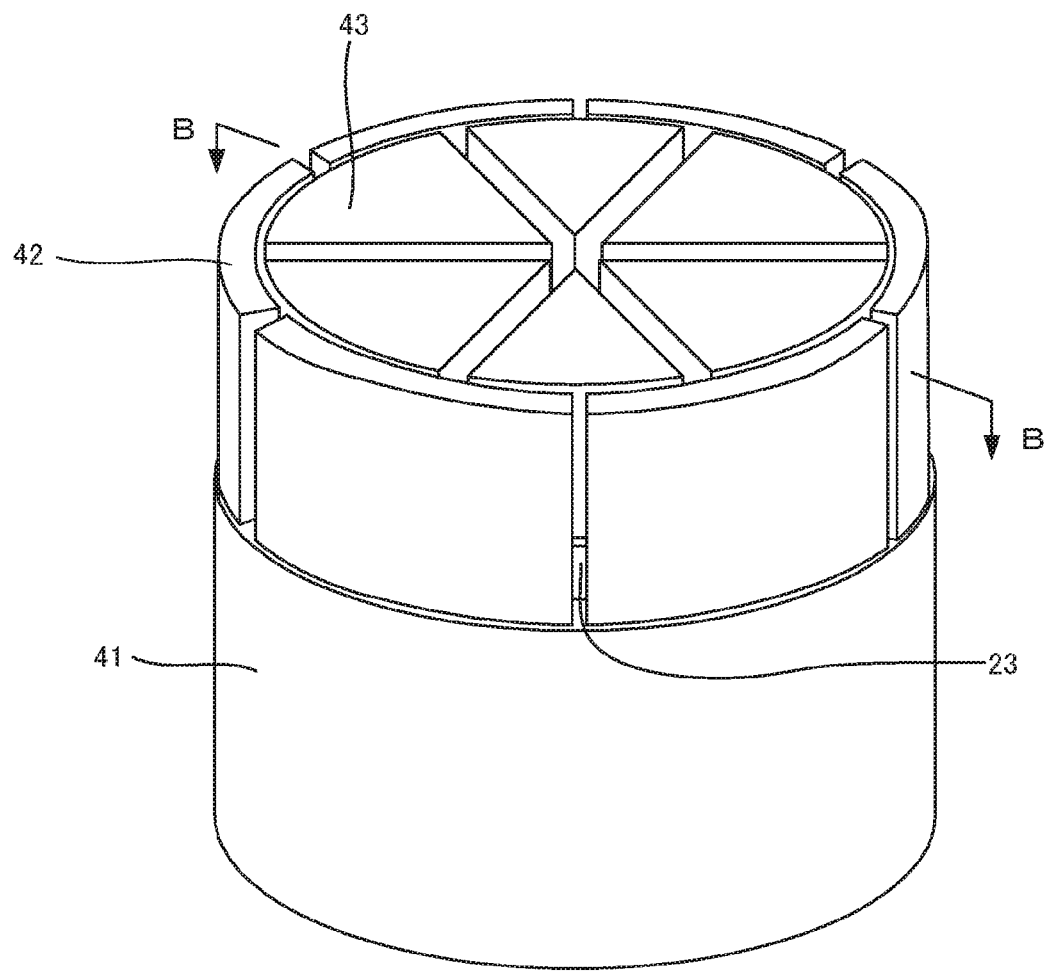
FIG. 8 is a perspective view illustrating the rotor manufacturing processes, specifically, a state where external collet segments and internal collet segments have been placed.
Figure 10:
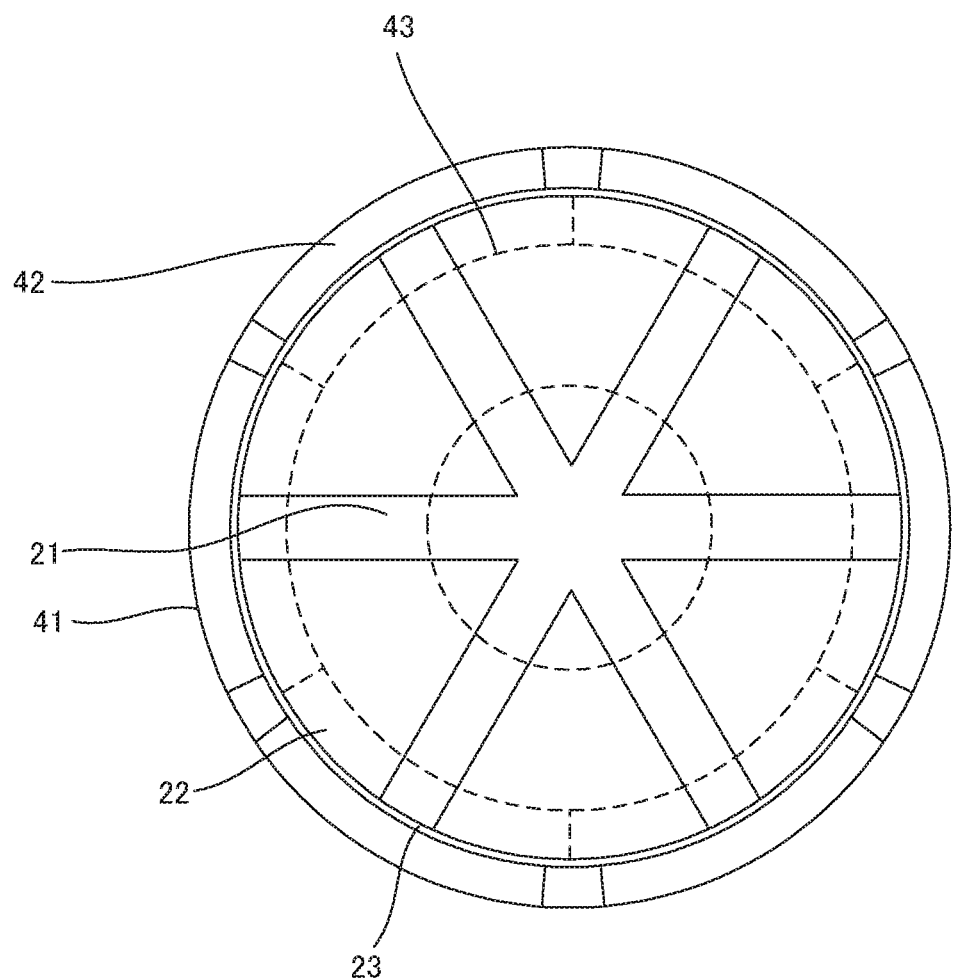
FIG. 10 is a plan view illustrating the rotor manufacturing processes, specifically, a state where the external collet segments and the internal collet segments have been placed.

In the first press process, at first, the plurality of first external collet segments 42, which are circumferentially separated from one another, are lined up in a shape of a ring atop the external die 41 as shown in FIGS. 8 and 10. The first external collet segments 42 are arranged to be in contact with an outer circumferential surface of the open end of the rotor cover 23 in such a manner that predetermined circumferential gaps are present between the first external collet segments 42. Furthermore, the first external collet segments 42 are arranged in such a manner that the circumferential gaps between themselves oppose the gaps between the permanent magnets 22 via the rotor cover 23 (see FIG. 10).

Figure 11:
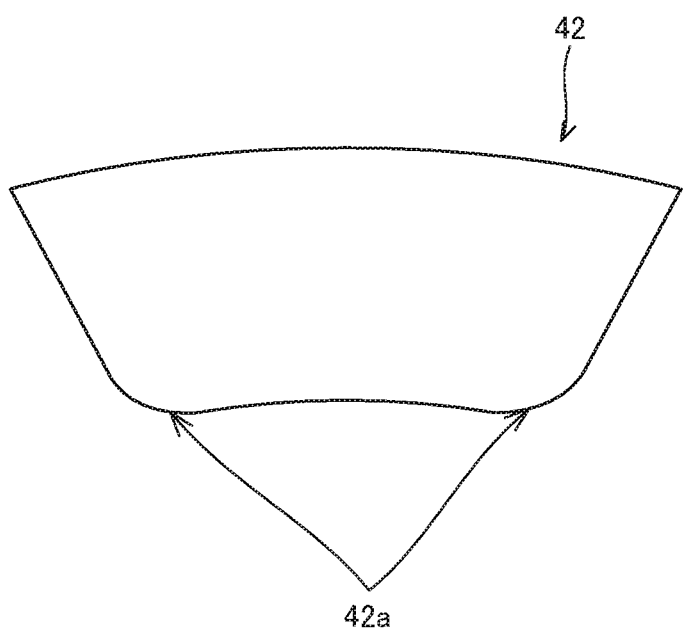
FIG. 11 is a plan view showing a first external collet segment used in a rotor manufacturing method according to the first embodiment of the present invention.

The first external collet segments 42 are obtained by dividing a tube in the circumferential direction. Thus, each first external collet 42 is formed into a shape of a substantial arc. As shown in FIG. 11, each first external collet segment 42 includes rounded portions 42a serving as beveled portions, and each rounded portion 42a is formed between a surface of the first external collet segment 42 opposing a first external collet segment 42 adjacent thereto, and a surface of the first external collet segment 42 opposing an outer circumferential surface of the rotor cover 23. As the rotor cover 23 is pressed radially inward by the first external collet segments 42, portions of the rotor cover 23 that oppose the gaps between the first external collet segments 42 smoothly come into contact with the rounded portions 42a of the first external collet segments 42 and enter the gaps between the first external collet segments 42. The rounded portions 42a of the first external collet segments 42 prevent breaking of the rotor cover 23 when the rotor cover 23 is pushed radially inward by the first external collet segments 42. The beveled portions are not limited to the rounded portions, and may be chamfered portions.

Furthermore, the plurality of first internal collet segments 43, which are circumferentially separated from one another, are lined up in a shape of a ring atop the rotor core 21 at the inner circumferential side of the rotor cover 23 (see FIG. 8). The first internal collet segments 43 are arranged to be in contact with an inner circumferential surface of the open end of the rotor cover 23 in such a manner that predetermined circumferential gaps are present between the first internal collet segments 43.

Subsequently, while the first internal collet segments 43 are pressed radially outward, the first external collet segments 42 are pressed radially inward. At this time, radially inward pressing forces acting on the first external collet segments 42 exceed radially outward pressing forces acting on the first internal collet segments 43. This makes the first external collet segments 42 move radially inward, thereby pushing the open end of the rotor cover 23 radially inward while an inner circumference of the open end of the rotor cover 23 is held by the first internal collet segments 43.

It is desirable to press the open end of the rotor cover 23 radially inward while the positions of the first external collet segments 42 and the first internal collet segments 43 in the axial direction are each defined by an auxiliary pressing member (not shown) with respect to the rotor core 21. In this way, in pressing the rotor cover 23 radially inward, the first external collet segments 42 and the first internal collet segments 43 are prevented from being lifted up and distanced from the rotor core 21 in the axial direction. This enables the upper surface portion 26 of the rotor cover 23 to be formed with high precision.

A portion of the rotor cover 23 that is pushed radially inward may be simply pulled, or may be stretched as in a drawing process, radially inward by the first external collet segments 42 and the first internal collet segments 43. Whether the portion is pulled or stretched is adjusted depending on the relationship between the pressing forces of the first external collet segments 42 and the first internal collet segments 43. In other words, the open end of the rotor cover 23 may be bent radially inward while the pressing forces of the first external collet segments 42 and the first internal collet segments 43 are applied to the rotor cover 23 as wrinkle holding forces. The pressing forces of the first external collet segments 42 and the first internal collet segments 43 may aggressively reduce the wall thickness of the rotor cover 23. Wrinkles may be or may not be formed in the portion of the rotor cover 23 that is pushed radially inward in pulling or stretching the portion.

The first external collet segments 42 press the rotor cover 23 not only radially inward, but also axially downward. This can reduce springback upon completion of the upper surface portion 26. Axially downward pressing by the first external collet segments 42 is attributed to the weight of the first external collet segments 42 or application of an external stress, and takes place after the first external collet segments 42 have sufficiently moved radially inward.

Figure 12:
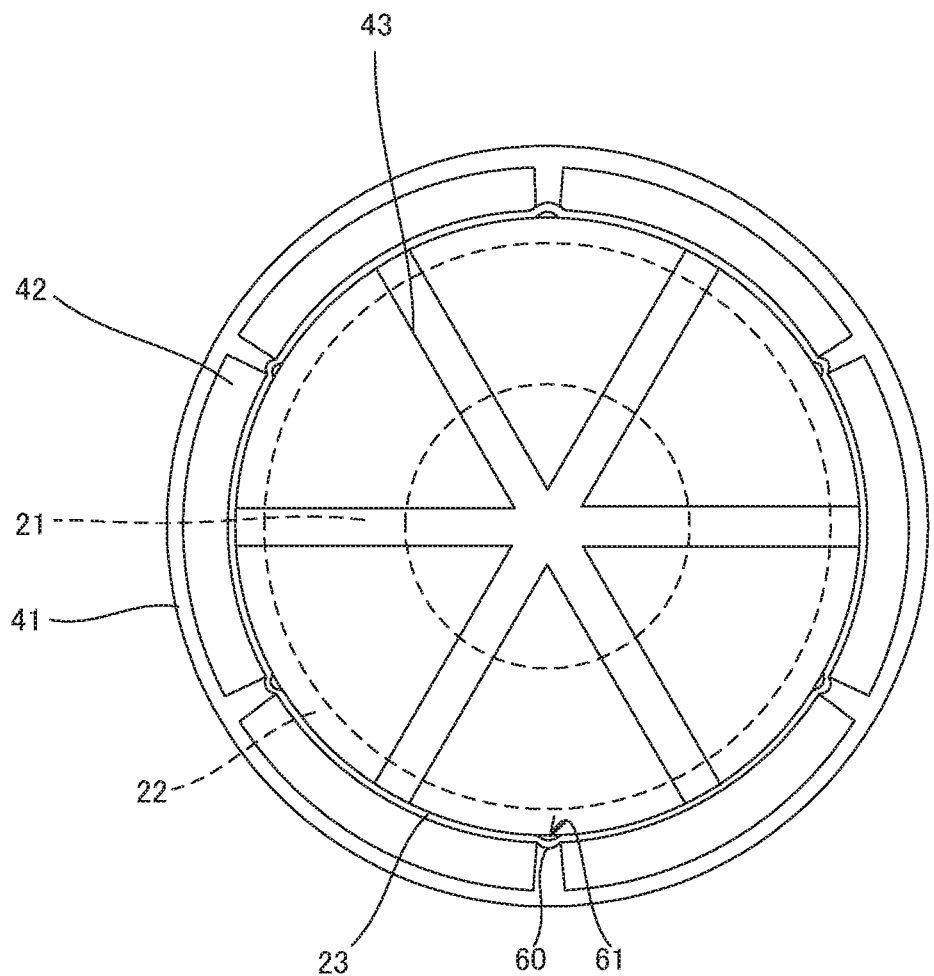
FIG. 12 is a plan view illustrating a first press process of the rotor manufacturing processes.

As shown in FIG. 12, the open end of the rotor cover 23 is pushed radially inward so that the gaps between the first external collet segments 42 and the gaps between the first internal collet segments 43 decrease. In the first press process, the amount of radially inward movement of the first external collet segments 42 is detected by a sensor (not shown). The gaps between the first external collet segments 42 are computed on the basis of the shape and the amount of movement of the first external collet segments 42. When the computed gaps have reached a predetermined amount, the radially inward movement of the first external collet segments 42 is stopped, and the first press process is completed. Thus, in the first press process, the rotor cover 23 is pressed radially inward while the amount of movement of the first external collet segments 42 is controlled so that a predetermined gap remains between neighboring first external collet segments 42, that is to say, neighboring first external collet segments 42 do not come into contact with each other.

Figure 13:
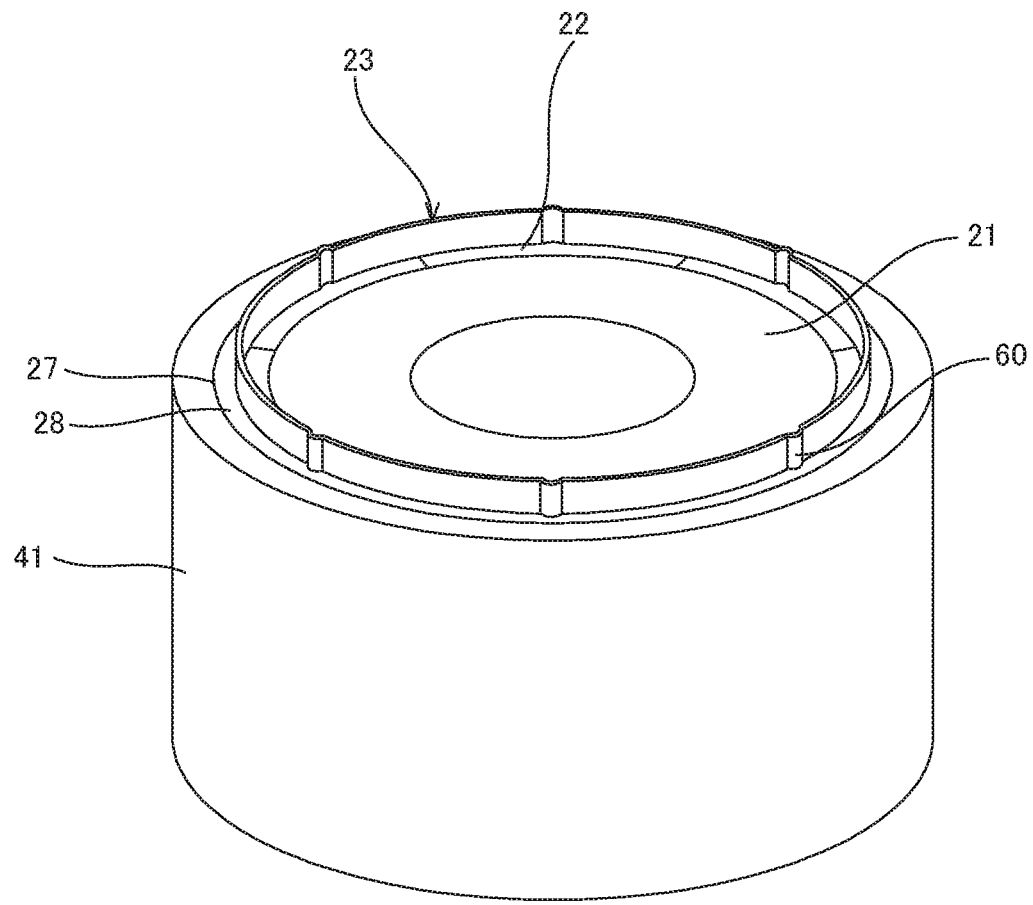
FIG. 13 is a perspective view showing a state that follows the removal of an external die in a state of FIG. 12.

Consequently, as shown in FIG. 13, removal of the first external collet segments 42 and the first internal collet segments 43 reveals that the open end of the rotor cover 23 has been pressed radially inward relative to the tubular portion 24, and that the angular portion 27 has been formed in conformity to the outer shape of the permanent magnets 22. Furthermore, as shown in FIGS. 12 and 13, the portions of the rotor cover 23 that oppose the gaps between the first external collet segments 42 are guided into the gaps between the first external collet segments 42. This results in formation of bulging portions 60 that swell radially outward in the rotor cover.

The bulging portions 60 are each formed into a shape of a smooth arc, and define recesses 61 at their radially inner side. The recesses 61 are recessed compared with other portions of the rotor cover 23. That is to say, a wall surface of each bulging portion 60 consists only of a continuous curved surface. In order to form such bulging portions 60, it is desirable that the first external collet segments 42 have the beveled portions. However, as long as the bulging portions 60 are formed, the first external collet segments 42 may not have the beveled portions.

Figure 14:
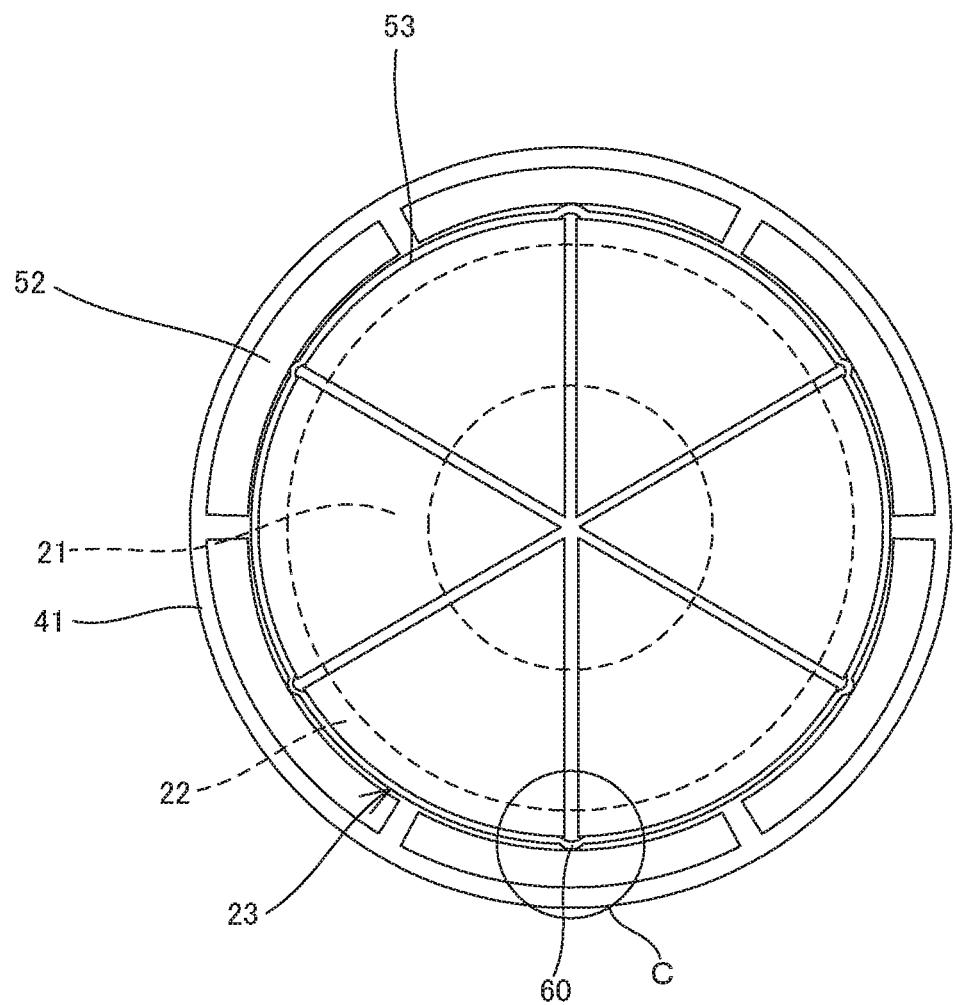
FIG. 14 is a plan view illustrating a second press process of the rotor manufacturing processes.

In the next second press process, as shown in FIG. 14, the second external collet segments 52 are arranged at the outer circumferential side of the open end of the rotor cover 23, and the second internal collet segments 53 are arranged at the inner circumferential side of the open end of the rotor cover 23. The second external collet segments 52 are arranged to be in contact with the bulging portions 60. That is to say, the second external collet segments 52 are arranged in such a manner that circumferential gaps between themselves are not aligned with the bulging portions 60 in the circumferential direction.

Figure 15:
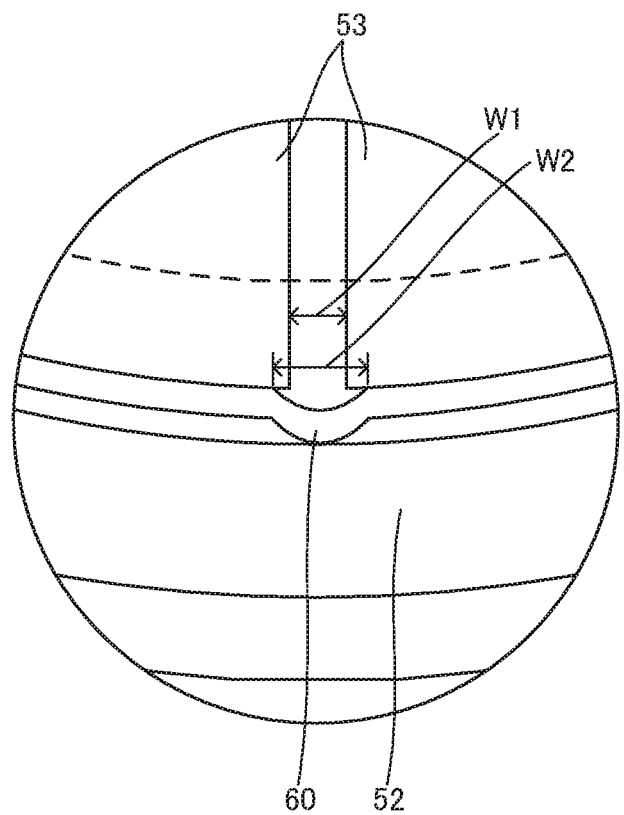
FIG. 15 is an enlarged view of section C in FIG. 14.

The second internal collet segments 53 are arranged in such a manner that circumferential gaps between themselves oppose the recesses 61 defined by the bulging portions 60. As shown in FIG. 15, the second internal collet segments 53 are arranged in such a manner that the circumferential gaps W1 between themselves are smaller than a circumferential length W2 of each bulging portion 60 at the radially inner side. That is to say, each bulging portion 60 is formed in such a manner that its radially inner boundaries with other portions of the rotor cover 23 are in contact with the second internal collet segments 53.

Subsequently, while the second internal collet segments 53 are pressed radially outward, the second external collet segments 52 are pressed radially inward. At this time, similarly to the aforementioned first press process, pressing forces of the second external collet segments 52 exceed pressing forces of the second internal collet segments 53. Consequently, the open end of the rotor cover 23 is pushed radially inward by the second external collet segments 52 while its inner circumference is held by the second internal collet segments 53.

At this time, similarly to the first press process, it is desirable to press the rotor cover 23 radially inward while the positions of the second external collet segments 52 and the second internal collet segments 53 in the axial direction are defined with respect to the rotor core 21.

Furthermore, at this time, similarly to the first press process, a portion of the rotor cover 23 that is pushed radially inward may be simply pulled, or may be stretched as in a drawing process, radially inward by the second external collet segments 52 and the second internal collet segments 53.

The second external collet segments 52 press the rotor cover 23 not only radially inward, but also axially downward. This can reduce springback upon completion of the upper surface portion 26. Axially downward pressing by the second external collet segments 52 is attributed to the weight of the second external collet segments 52 or application of an external stress, and takes place after the second external collet segments 52 have sufficiently moved radially inward.

Figure 16:
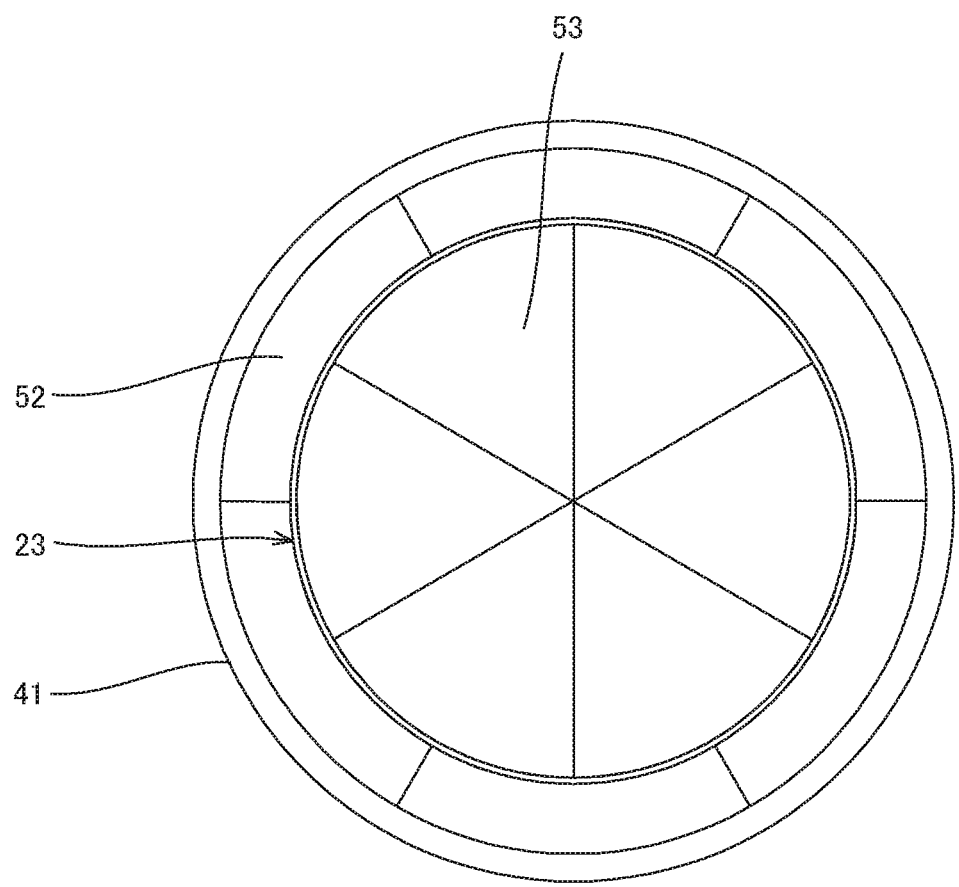
FIG. 16 is a plan view illustrating the rotor manufacturing processes, specifically, a state where the second press process has been completed.
Figure 17:
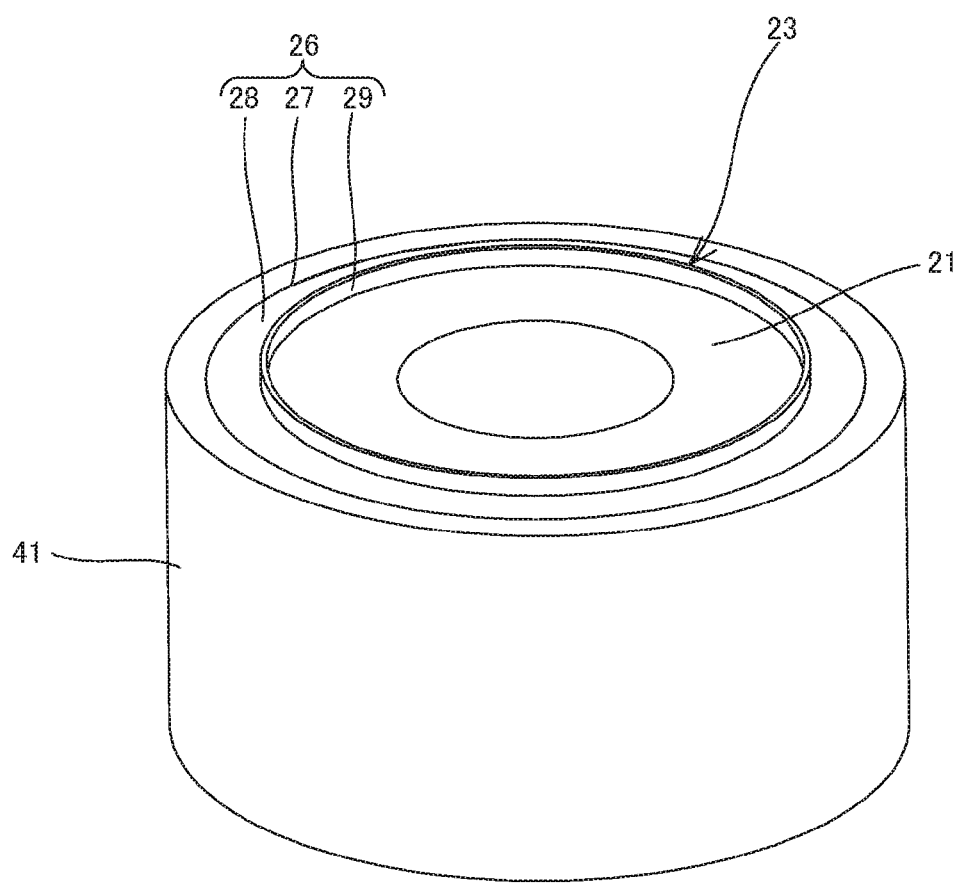
FIG. 17 is a perspective view illustrating the rotor manufacturing processes, specifically, a state that follows the removal of external collet segments and internal collet segments in the state of FIG. 16.

As shown in FIG. 16, the open end of the rotor cover 23 is pushed radially inward to the point where there is no gap between the second external collet segments 52 and between the second internal collet segments 53. Consequently, as shown in FIG. 17, removal of the second external collet segments 52 and the second internal collet segments 53 reveals that the open end of the rotor cover 23 has been further pushed radially inward relative to the tubular portion 24, and that the boss portion 29 has been formed to project in the axial direction of the rotor core 21 from the radially inner side of the flange portion 28.

As the upper surface portion 26 includes the boss portion 29, the stiffness of the upper surface portion 26 is improved. This reduces springback of the upper surface portion 26 in the axial rise direction (the direction of the arrow in FIG. 3) and the circumferential direction (the direction of the arrow in FIG. 2) after the upper surface portion 26 has been formed by pressing the open end of the tubular portion 24. The reduction in springback of the upper surface portion 26 in the circumferential direction prevents formation of a gap between the angular portion 27 and the permanent magnets 22. As a result, an axial gap between the rotor core 21 and the rotor cover 23 is reduced, and formation of a gap between the angular portion 27 and the permanent magnets 22 is prevented. Therefore, the rotation of the rotor cover 23 can be stopped more reliably.

The gaps W1 between the second internal collet segments 53 are smaller than the circumferential length W2 of each bulging portion 60 at the radially inner side. Thus, the bulging portions 60 are pushed radially inward without entering the gaps between the second internal collet segments 53. Consequently, the angular portion 27 conforming to the outer shape of the permanent magnets 22, the flange portion 28 extending radially inward from the angular portion 27, and the boss portion 29 projecting in the axial direction of the rotor core 21 from the radially inner side of the flange portion 28 are formed throughout the entire circumference of the rotor cover 23.

Figure 18:
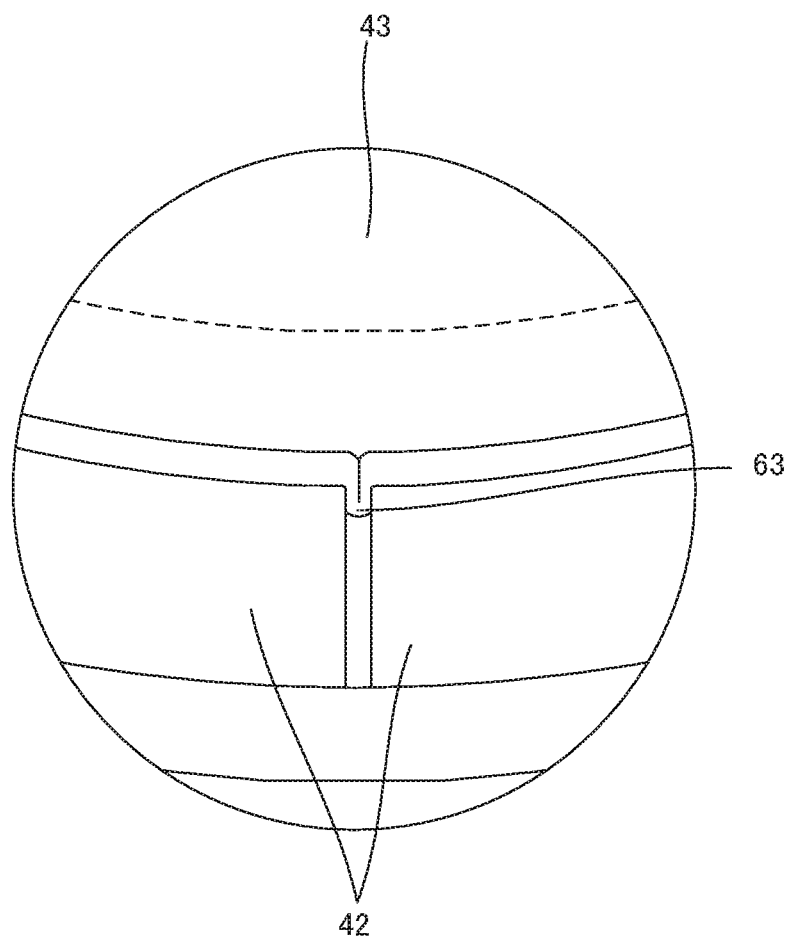
FIG. 18 is an enlarged view illustrating a rotor manufacturing method according to a comparative example.

With reference to FIG. 18, the following describes a rotor manufacturing method according to a comparative example so as to facilitate the understanding of a rotor manufacturing method according to the first embodiment.

In a first press process of the rotor manufacturing method according to the comparative example, the first external collet segments 42 press the rotor cover 23 radially inward to the point where there is almost no gap between neighboring first external collet segments 42. Along with the radially inward movement of the first external collet segments 42, portions of the rotor cover 23 that oppose the gaps between the first external collet segments 42 enter the gaps between the first external collet segments 42. Once the first external collet segments 42 have moved to the point where there is almost no gap between the first external collet segments 42, each of the portions of the rotor cover 23 that have entered the gaps between the first external collet segments 42 is clamped in the circumferential direction by opposing surfaces of neighboring first external collet segments 42. As a result, as shown in FIG. 18, the angular portion 27, as well as bent portions 63 that have been bent by being clamped by the first external collet segments 42, is formed in the rotor cover 23.

If the bent portions 63 are left unprocessed in a second press process, the bent portions 63 may interfere with other members of the rotary electric machine 100. Therefore, in forming the upper surface portion 26, the bent portions 63 need to be pressed radially inward by the second external collet segments 52. However, as the bent portions 63 have been bent by being clamped in the circumferential direction by the first external collet segments 42, the stiffness of the bent portions 63 in the radial direction (the up-down direction in FIG. 18) is higher than the stiffness of other portions of the rotor cover 23. That is to say, compared with other portions of the rotor cover 23, the bent portions 63 are resistant to deformation in the radial direction. Therefore, even if the bent portions 63 are pressed radially inward, the already-processed angular portion 27 and flange portion 28 are stretched radially inward before the bent portions 63 are deformed. This gives rise to the possibility that the angular portion 27 and the flange portion 28 are reduced in wall thickness and break. In view of the above, the rotor manufacturing method according to the comparative example may cause the upper surface portion 26 to break and crack.

In contrast, in the first press process of the rotor manufacturing method according to the first embodiment, the rotor cover 23 is pressed radially inward so that the predetermined gaps remain between the first external collet segments 42. Therefore, the bulging portions 60 are formed instead of the bent portions 63. Each bulging portion 60 swells in a shape of an arc, thereby forming the recess 61 at its radially inner side. Thus, compared with the bent portions 63, the bulging portions 60 have low stiffness in the radial direction. This enables the bulging portions 60 to be easily pressed radially inward in the second press process, and to be formed as the upper surface portion 26 without the occurrence of breakage and cracks. In this way, the upper surface portion 26 can be formed throughout the entire circumference of the rotor cover 23 while preventing the occurrence of breakage and cracks.

As described above, it is sufficient to form the bulging portions 60 into a shape that prevents the angular portion 27 and the flange portion 28 from being stretched to a breaking point in the second press process. In other words, each bulging portion 60 can be formed into any shape as long as it swells outward in such a manner that every portion of its inner wall surface is out of contact with other portions of the inner wall surface, rather than being formed into the shape of the bent portions 63 that each have a self-contacting inner wall surface. For example, the wall surface of each bulging portion 60 is not limited to having a shape of a smooth arc defined by a continuous curved surface, and may include a linear portion having a linear shape.

Through the foregoing press process, the angular portion 27 conforming to the outer shape of the permanent magnets 22, the flange portion 28 extending radially inward from the angular portion 27, and the boss portion 29 axially projecting from the radially inner side of the flange portion 28 are formed in the rotor cover 23.

Subsequently, the external die 41 is removed, and the protrusion 25c is formed to axially project from the bottom portion 25 of the rotor cover 23 toward the inner side of the rotor cover 23. The protrusion 25c is formed by, for example, striking a stamping tool having a protrusion at its tip (not shown), such as a punch, into the bottom portion 25 from the outer side toward the inner side of the rotor cover 23 (from the right side toward the left side in FIG. 4). The formed protrusion 25c is in contact with an end surface of the rotor core 21. The protrusion 25c is formed after the upper surface portion 26 is formed. In this way, the rotor core 21 can be clamped between the upper surface portion 26 and the bottom portion 25. Therefore, the rotation of the rotor cover 23 can be stopped more reliably. The protrusion 25c need not project parallel to the axial direction, as long as it is in contact with the end surface of the rotor core 21 and enables the bottom portion 25 to clamp the rotor core 21 in the axial direction. The protrusion 25c may be formed in the flange portion 28 of the upper surface portion 26, or may be formed in both of the upper surface portion 26 and the bottom portion 25. When a hole/groove is formed in the end surface of the rotor core 21, the protrusion 25c may be formed to enter the hole/groove. In this case also, the rotation of the rotor cover 23 can be stopped more reliably.

Subsequently, the shaft 1 is inserted into the center of the rotor core 21. As a result, the rotor 2 having the shaft 1 is complete as shown in FIG. 2.

The foregoing first embodiment achieves the following effects.

With the rotor manufacturing method according to the first embodiment, the angular portion 27 is formed in the rotor cover 23 in conformity to the outer shape of the permanent magnets 22, and the permanent magnets 22 are circumferentially pushed by the rotor cover 23. This restricts relative rotations of the rotor cover 23 and the permanent magnets 22 in the circumferential direction. Therefore, the rotor manufacturing method according to the first embodiment can easily stop the rotation of the rotor cover 23. Furthermore, as the rotation can be stopped without needing additional processes, the number of processes can be reduced, that is to say, an increase in the number of processes can be suppressed in manufacturing the rotor.

The rotor manufacturing method according to the first embodiment includes the first press process of pressing the open end of the tubular portion 24 radially inward. The bulging portions 60 that swell radially outward are formed in the rotor cover 23 in the first press process. As the bulging portions 60 swell radially outward to define the recesses 61 at their radially inner side, they are easily deformed in the radial direction compared with the bent portions that have been bent by being clamped in the circumferential direction. Therefore, in the second press process, the flange portion 28 can be formed by pressing the bulging portions 60 radially inward with ease, without stretching the angular portion 27 and the flange portion 28 that have been formed in the first press process. In this way, the upper surface portion 26 can be formed throughout the entire circumference of the rotor cover 23 while preventing the rotor cover 23 from breaking and cracking.

The rotor 2 according to the first embodiment includes the rotor cover 23 provided with the boss portion 29 extending in the axial direction of the rotor core 21. The boss portion 29 reduces springback of the upper surface portion 26, thereby reducing an axial gap between the rotor cover 23 and the rotor core 21. Therefore, the rotation of the rotor cover 23 can be stopped more reliably.

Figure 9:
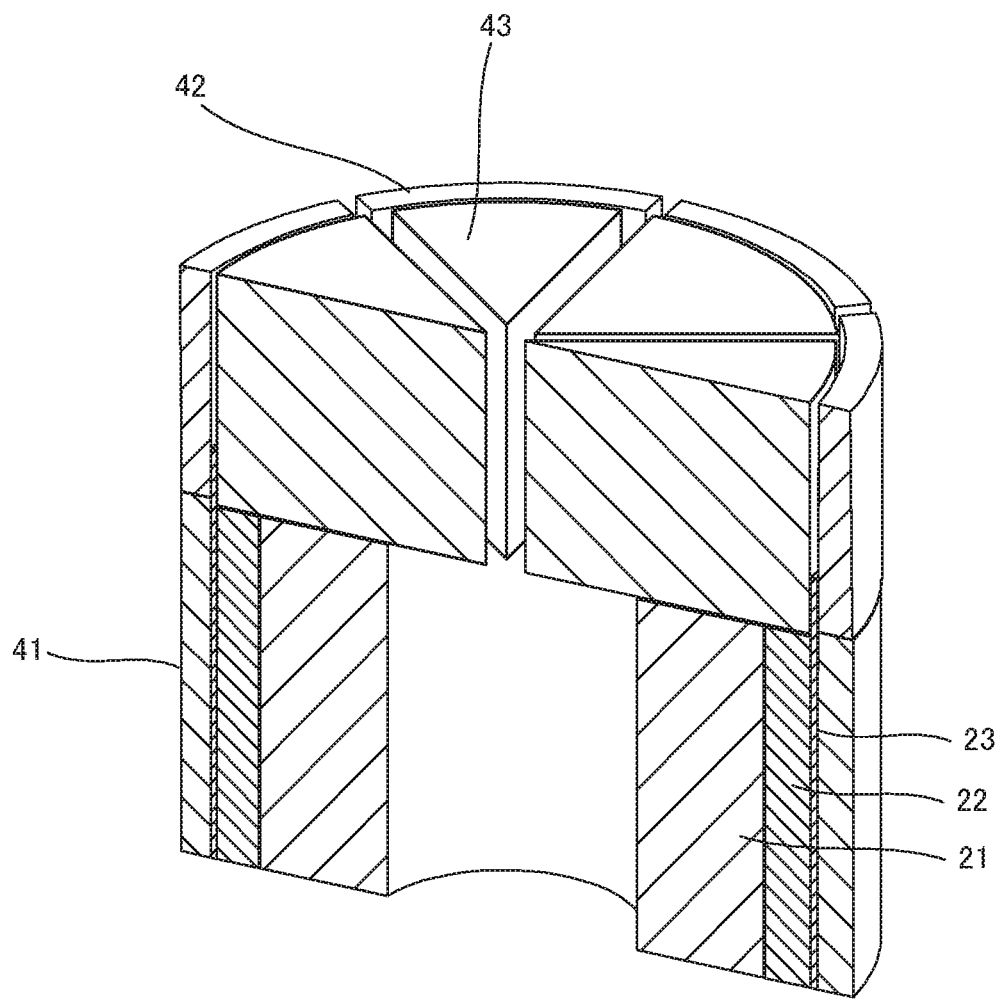
FIG. 9 is a cross-sectional view taken along the line B-B in FIG. 8.

As shown in FIG. 9, the height of the external die 41 is substantially the same as the height of the rotor core 21. This enables positioning of the first external collet segments 42 in the height direction. As a result, the process of pressing the first external collet segments 42 radially inward can be performed in a stable manner. Furthermore, the first external collet segments 42 and the second external collet segments 52 exert pressing forces not only radially inward, but also axially downward. This can reduce springback of the upper surface portion 26 of the rotor cover 23.

(Second Embodiment)

A description is now given of a rotor manufacturing method according to a second embodiment of the present invention with reference to FIGS. 19 to 22C. The following description centers on differences from the above first embodiment. Components that are the same as components used in the rotor manufacturing method according to the above first embodiment will be given the same reference signs, and a description of such components will be omitted.

In the above first embodiment, the process of pressing the tubular portion 24 radially inward (the first press process) is completed with a gap remaining between neighboring first external collet segments 42.

Figure 19:
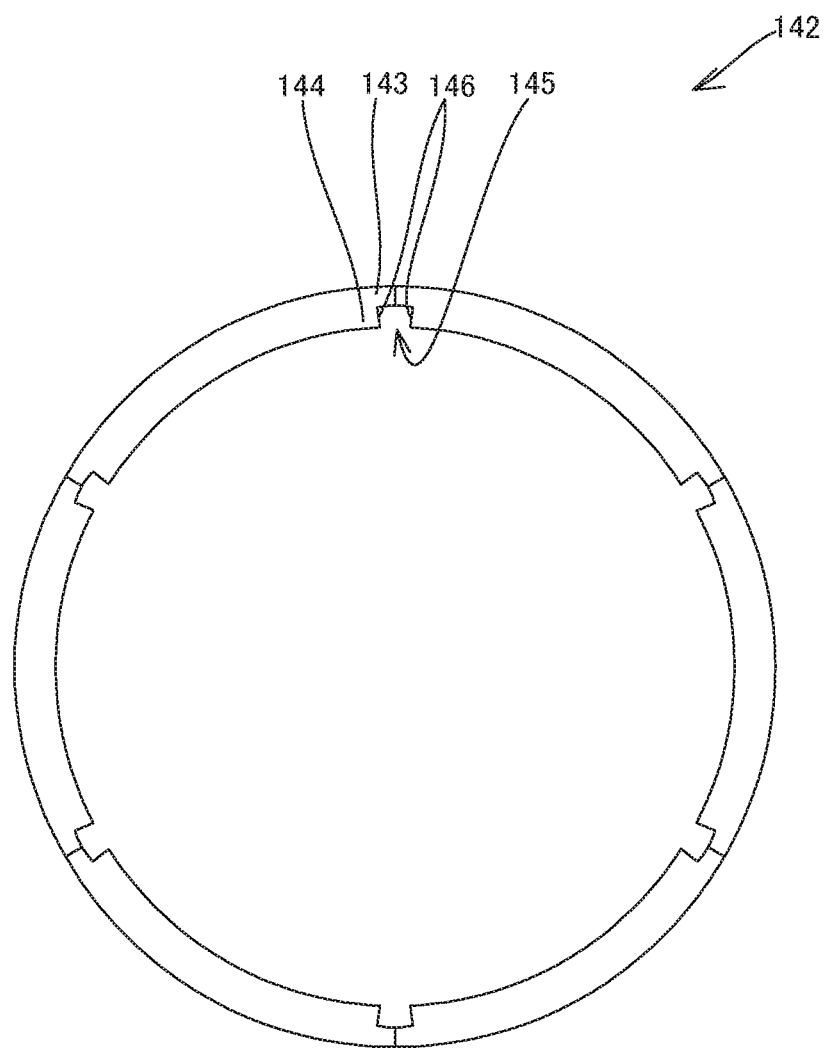
FIG. 19 is a plan view showing first external collet segments used in a rotor manufacturing method according to a second embodiment of the present invention.

In contrast, with the rotor manufacturing method according to the second embodiment, each of first external collet segments 142 includes a contact portion 143 and a pressing portion 144 as shown in FIG. 19. When lined up in a shape of a ring, the contact portions 143 can come into contact with first external collet segments 142 adjacent thereto. The pressing portions 144 are located more radially inward than the contact portions 143 are to press the rotor cover 23. At the inner side of the first external collet segments 142, collet recesses 145 opposing an outer circumference of the rotor cover 23 are formed, each by the pressing portions 144 of neighboring first external collet segments 142. The foregoing differences exist between the rotor manufacturing method according to the second embodiment and the rotor manufacturing method according to the first embodiment.

As shown in FIG. 19, when lined up in a shape of a ring, the contact portions 143 of the first external collet segments 142 can come into contact with the contact portions 143 of first external collet segments 142 adjacent thereto. While the contact portions 143 are in contact with one another, a radially inward movement of the first external collet segments 142 is restricted. In a state where the contact portions 143 are arranged in a shape of a ring with the pressing portions 144 being in contact with the outer circumference of the rotor cover 23, a gap is present between neighboring contact portions 143 (see FIG. 20).

The pressing portions 144 are formed to project radially inward from the inner side of the contact portions 143, and are located more radially inward than the contact portions 143 are. The pressing portions 144 have a smaller circumferential length than the contact portions 143. That is to say, the pressing portions 144 have a smaller central angle than the contact portions 143. Therefore, as shown in FIG. 19, when the first external collet segments 142 are arranged in a shape of a ring, the pressing portions 144 form the collet recesses 145 opposing the rotor cover 23. The pressing portions 144 have surfaces 146 that define the collet recesses 145, and the surfaces 146 have a planar shape parallel to the radial direction.

Figure 20:
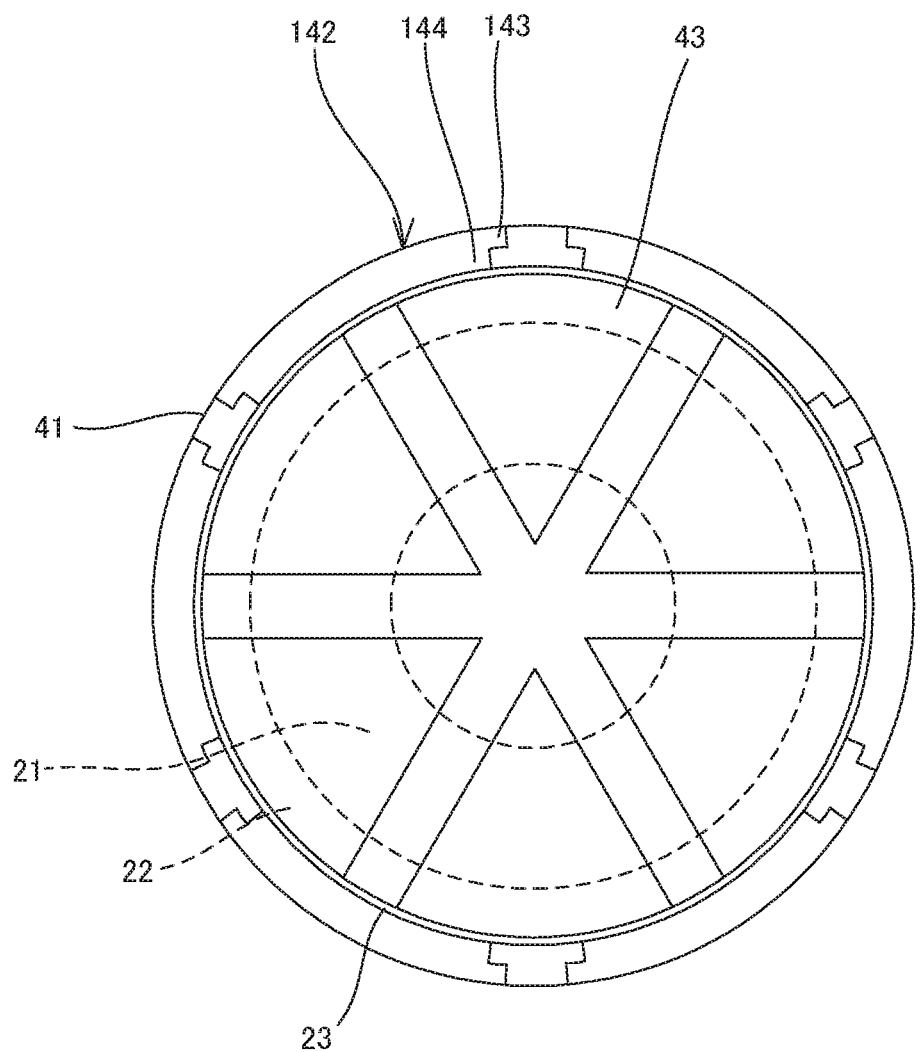
FIG. 20 is a plan view illustrating a first press process of the rotor manufacturing method according to the second embodiment of the present invention.

In a first press process, as shown in FIG. 20, the first external collet segments 142 are arranged in such a manner that the pressing portions 144 are in contact with the outer circumferential surface of the open end of the rotor cover 23, with the presence of predetermined circumferential gaps between the contact portions 143. Similarly to the above first embodiment, the first internal collet segments 43, which are circumferentially separated from one another, are lined up in a shape of a ring atop the rotor core 21 and at the inner circumferential side of the rotor cover 23. The first internal collet segments 43 are arranged to be in contact with the inner circumferential surface of the open end of the rotor cover 23 in such a manner that predetermined circumferential gaps are present between the first internal collet segments 43.

Subsequently, while the first internal collet segments 43 are pressed radially outward, the first external collet segments 142 are pressed radially inward. At this time, similarly to the above first embodiment, radially inward pressing forces acting on the first external collet segments 142 exceed radially outward pressing forces acting on the first internal collet segments 43. This makes the first external collet segments 142 move radially inward. Also, the open end of the rotor cover 23 is pushed radially inward by the first external collet segments 142 while its inner circumference is held by the first internal collet segments 43.

Figure 21:
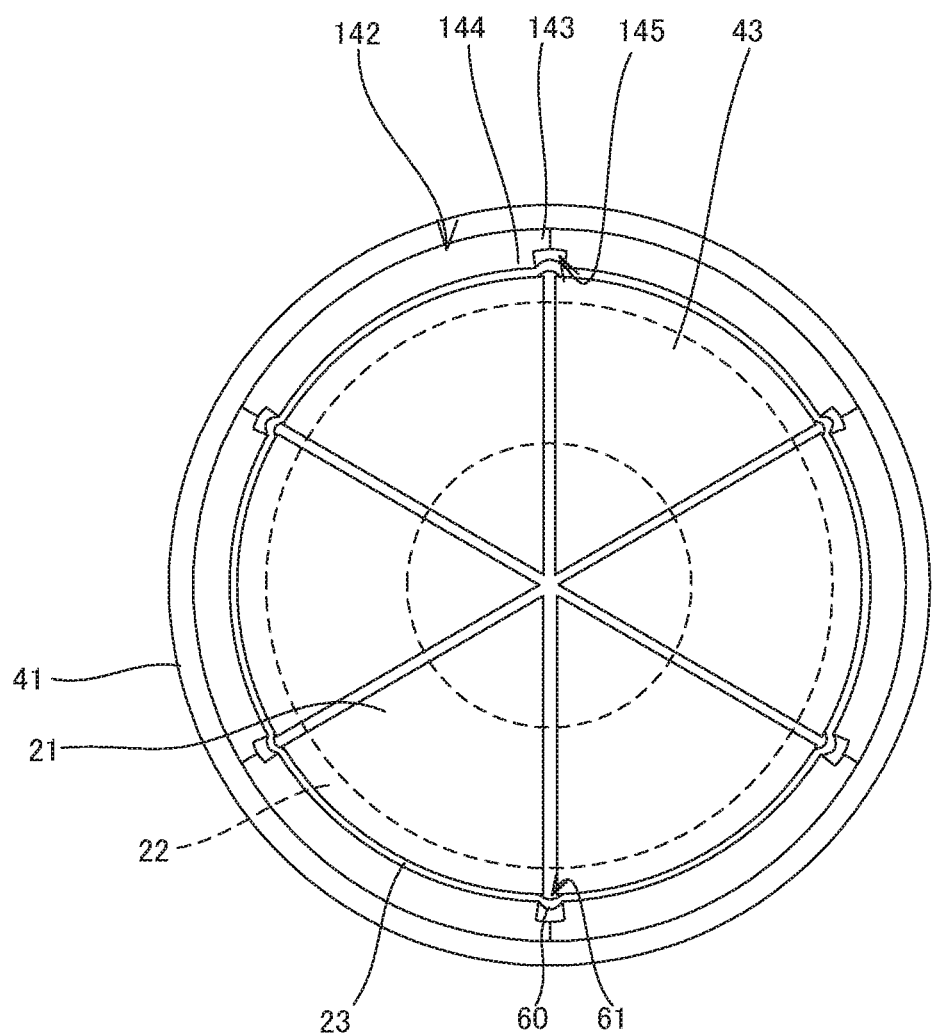
FIG. 21 is a plan view illustrating the rotor manufacturing method according to the second embodiment of the present invention, specifically, a state in which the first press process has been completed.

As shown in FIG. 21, the open end of the rotor cover 23 is pushed radially inward so that the gaps between the first external collet segments 142 and the gaps between the first internal collet segments 43 decrease. The first press process according to the second embodiment is completed when the first external collet segments 142 have moved to the point where the contact portions 143 of neighboring first external collet segments 142 are in contact with each another. Consequently, similarly to the above first embodiment, removal of the first external collet segments 142 and the first internal collet segments 43 reveals that the open end of the rotor cover 23 has been pressed radially inward relative to the tubular portion 24, and that the angular portion 27 has been formed in conformity to the outer shape of the permanent magnets 22.

Portions of the rotor cover 23 that oppose the collet recesses 145 formed between the first external collet segments 142 are pushed more radially inward in areas close to the pressing portions 144 than in areas far from the pressing portions 144. Therefore, as shown in FIG. 21, the portions of the rotor cover that oppose the collet recesses 145 are formed as the bulging portions 60, similarly to the first embodiment.

As described above, in the first press process, the bulging portions 60 can be formed by pressing the first external collet segments 142 radially inward to the point where the contact portions 143 are in contact with one another. Thus, as opposed to the first embodiment that controls the amount of movement of the first external collet segments 42 to leave the predetermined gaps between the first external collet segments 42, such control is unnecessary, and the bulging portions 60 can be easily formed. Furthermore, reproducibility can be improved in forming the bulging portions 60.

The foregoing second embodiment achieves not only the effects similar to the effects of the first embodiment, but also the following effects.

In the first press process, each first external collet segment 142 includes the contact portion 143 and the pressing portion 144. When lined up in a shape of a ring, the contact portions 143 can come into contact with first external collet segments 142 adjacent thereto. The pressing portions 144 project radially inward from the inner side of the contact portions 143, and press the rotor cover 23. At the inner side of the first external collet segments 142, the collet recesses 145 opposing the outer circumference of the rotor cover 23 are formed, each by the pressing portions 144 of neighboring first external collet segments 142. This enables the first press process to press the first external collet segments 142 radially inward to the point where the contact portions 143 are in contact with one another, thereby forming the bulging portions 60 in the portions of the rotor cover 23 that oppose the collet recesses 145. In such a first press process, it is sufficient to press the first external collet segments 142 radially inward to the point where the contact portions of neighboring first external collet segments 142 are in contact with each other. Thus, there is no need to detect and control the amount of radially inward movement of the first external collet segments 142. In this way, the bulging portions 60, as well as the upper surface portion 26 of the rotor cover 23, can be easily formed.

A description is now given of modification examples of the second embodiment.

Figure 22A:
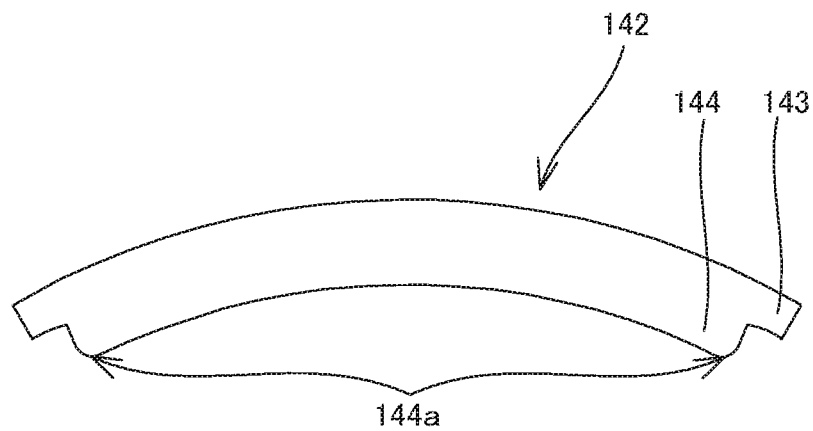
FIG. 22A is a plan view showing a modification example of a first external collet segment used in the rotor manufacturing method according to the second embodiment of the present invention, specifically, a first external collet segment including beveled portions.
Figure 22B:
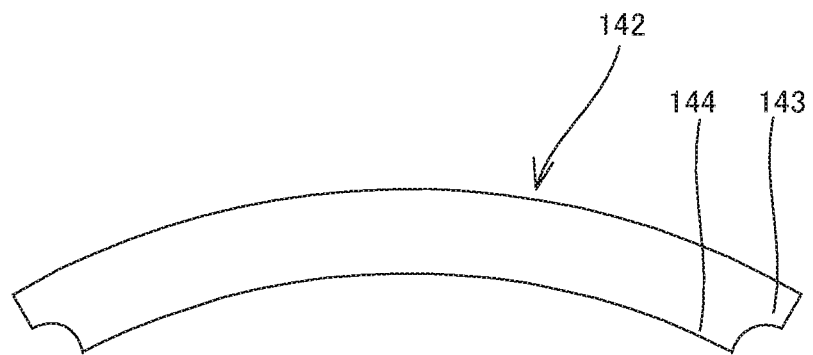
FIG. 22B is a plan view showing a modification example of a first external collet segment used in the rotor manufacturing method according to the second embodiment of the present invention, specifically, a first external collet segment formed in such a manner that its surfaces defining collet recesses are curved surfaces.
Figure 22C:
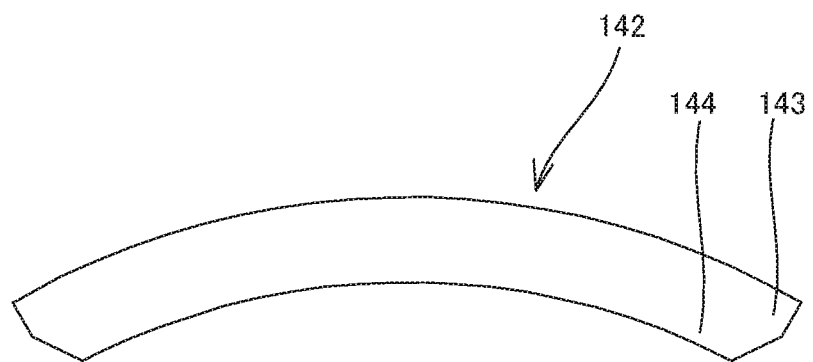
FIG. 22C is a plan view showing a modification example of a first external collet segment used in the rotor manufacturing method according to the second embodiment of the present invention, specifically, a first external collet segment formed in such a manner that its surfaces defining collet recesses are planar surfaces tilted with respect to a radial direction.

As shown in FIG. 22A, rounded portions 144a serving as beveled portions may be formed in each first external collet segment 142, between the surface of the pressing portion 144 opposing the rotor cover 23 and the surfaces of the pressing portion 144 defining the collet recesses 145. The beveled portions may be chamfered portions. Alternatively, as shown in FIG. 22B, each first external collet segment 142 may be formed in such a manner that the surfaces of the pressing portion 144 defining the collet recesses 145 are curved surfaces. Alternatively, as shown in FIG. 22C, each first external collet segment 142 may be formed in such a manner that the surfaces of the pressing portion 144 defining the collet recesses 145 are planar surfaces tilted with respect to the radial direction. As such, the first external collet segments 142 can be formed into any shape as long as the collet recess 145 opposing the rotor cover 23 is formed between neighboring first external collet segments 142.

Figure 23A:
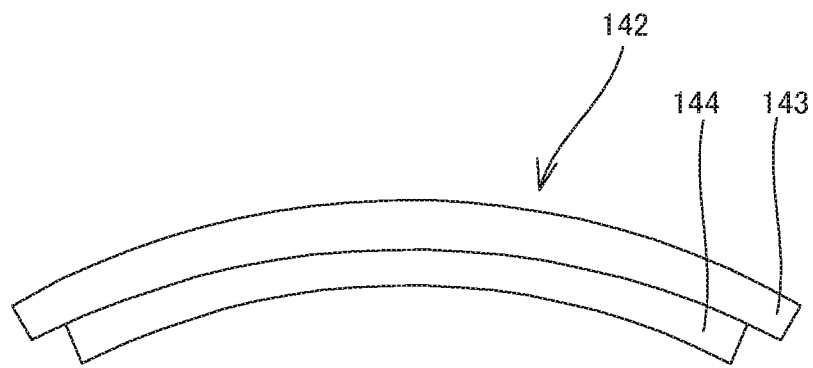
FIG. 23A is a plan view showing a modification example of a first external collet segment used in the rotor manufacturing method according to the second embodiment of the present invention, specifically, a pressing portion attached to the inner side of a contact portion as a separate body.
Figure 23B:
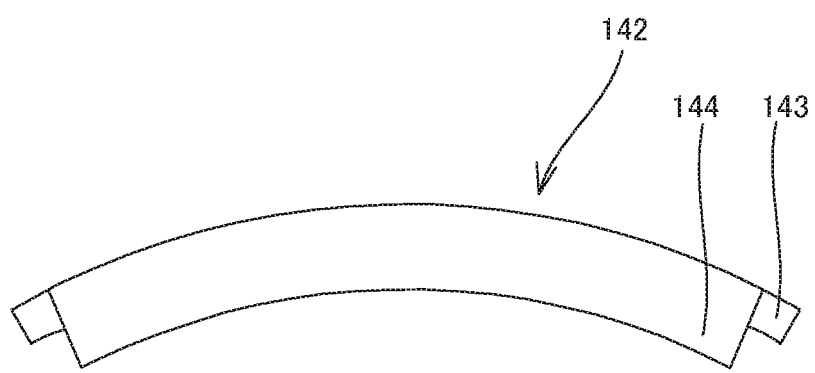
FIG. 23B is a plan view showing a modification example of a first external collet segment used in the rotor manufacturing method according to the second embodiment of the present invention, specifically, a contact portion attached to both circumferential ends of a pressing portion as a separate body.

In the foregoing second embodiment, as shown in FIG. 19, the contact portion 143 and the pressing portion 144 of each first external collet segment 142 are integrally formed. Alternatively, the contact portion 143 and the pressing portion 144 of each first external collet segment 142 may be formed as separate bodies. Specifically, as shown in FIG. 23A, each first external collet segment 142 may be formed by detachably attaching the pressing portion 144 to the inner side of the contact portion 143 having an arc-like cross-section. Alternatively, as shown in FIG. 23B, each first external collet segment 142 may be formed by detachably attaching the contact portion 143 to both circumferential end surfaces of the pressing portion 144.

When the contact portions 143 and the pressing portions 144 are constructed as separate bodies, the circumferential width of the collet recesses 145 can be adjusted by combining the contact portions 143 and the pressing portions 144 of freely-selected shapes. Furthermore, as the amount of movement of the first external collet segments 142 can be freely adjusted in the first press process, the bulging portions 60 can be adjusted in size. Moreover, for example, even when rotor covers 23 of different outer diameters are used, dies for the contact portions 143 and the pressing portions 144 can be shared in common.

(Third Embodiment)

Figure 24:
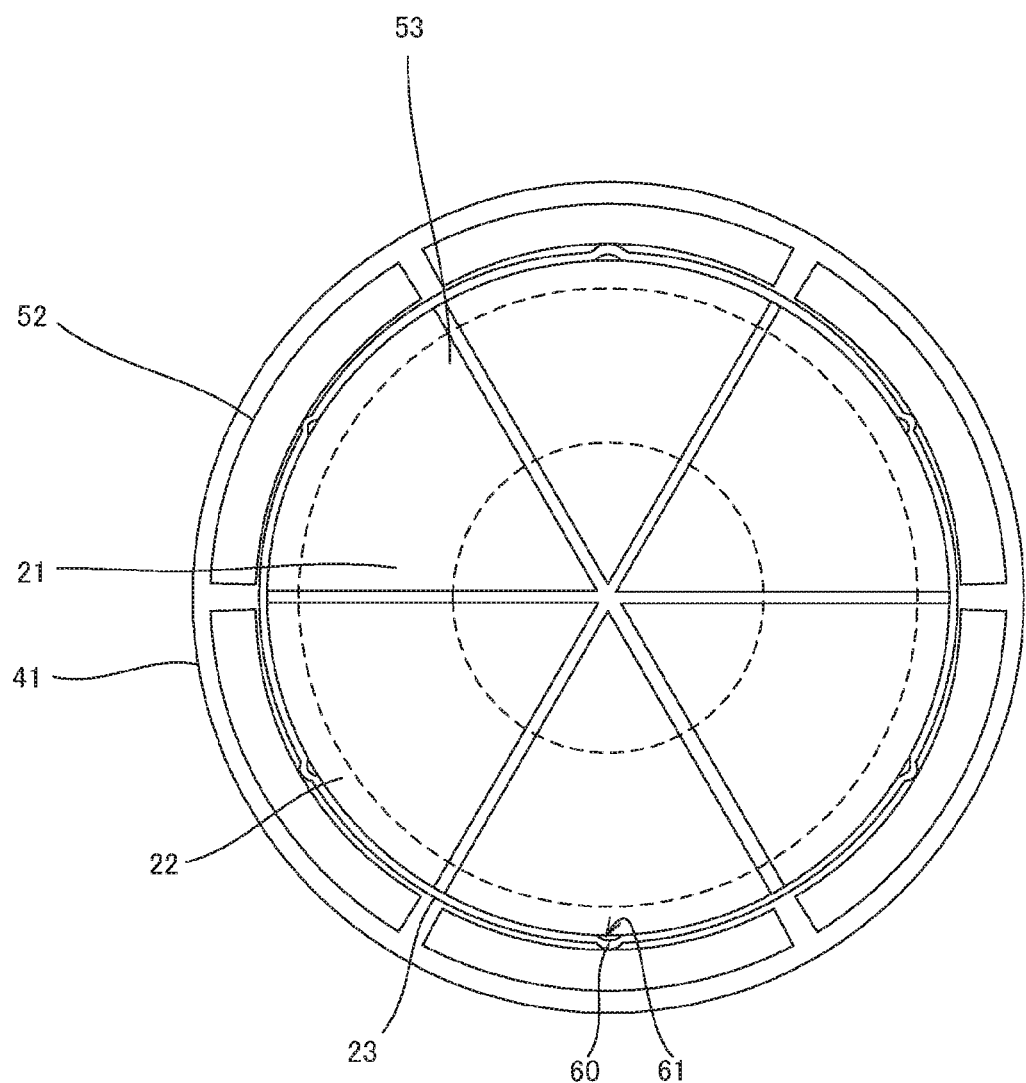
FIG. 24 is a plan view illustrating a second press process of a rotor manufacturing method according to a third embodiment of the present invention.

A description is now given of a rotor manufacturing method according to a third embodiment of the present invention with reference to FIG. 24. The following description centers on differences from the above first embodiment. Components that are the same as components used in the rotor manufacturing method according to the above first embodiment will be given the same reference signs, and a description of such components will be omitted.

In the second press process according to the above first embodiment, the second internal collet segments 53 are arranged in such a manner that the gaps between themselves oppose the recesses 61 at the inner side of the bulging portions 60.

The rotor manufacturing method according to the third embodiment differs from the rotor manufacturing method according to the first embodiment in that, in a second press process, the second internal collet segments 53 are arranged in such a manner that the gaps between themselves are not aligned with the bulging portions 60 in the circumferential direction.

As shown in FIG. 24, in the second press process of the rotor manufacturing method according to the third embodiment, the second internal collet segments 53 are arranged in such a manner that the gaps between themselves are not aligned with the recesses 61 of the bulging portions 60 in the circumferential direction, and the recesses 61 of the bulging portions 60 oppose the second internal collet segments 53. That is to say, in the second press process, each second external collet segment 52 and the corresponding second internal collet segment 53 are arranged to oppose each other via the corresponding bulging portion 60. Accordingly, in the second press process, the bulging portions 60 are pressed radially inward while being interposed between the second external collet segments 52 and the second internal collet segments 53.

The rotor manufacturing method according to the foregoing third embodiment achieves not only the effects similar to the effects of the first embodiment, but also the following effects.

In the second press process of the rotor manufacturing method according to the third embodiment, the bulging portions 60 are pressed radially inward while being interposed between the second external collet segments 52 and the second internal collet segments 53. Thus, the occurrence of wrinkles is suppressed by holding forces exerted by the second external collet segments 52 and the second internal collet segments 53. This enables formation of the upper surface portion 26 through processing of the bulging portions 60 in the presence of few wrinkles.

The following provides an overall description of the configurations, functions, and effects of the embodiments of the present invention.

In each of the above embodiments, the rotor manufacturing method manufactures the rotor 2 including the rotor core 21. The rotor core 21 is fixed to the shaft 1 in such a manner that the rotor core 21 is rotatable integrally with the shaft 1, and the permanent magnets 22 have been mounted on the rotor core 21 throughout the circumferential direction. The rotor manufacturing method includes: a process of covering the outer circumference of the rotor core 21 with the tubular rotor cover 23; and a process of forming the angular portion 27 conforming to the outer shape of the permanent magnets 22 by pressing the open end of the rotor cover 23 radially inward with the use of the pressing members (the first external collet segments 42, 142 and the second external collet segments 52). The open end of the rotor cover 23 axially projects from the end of the rotor core 21 before being pressed.

With the foregoing configuration, the angular portion 27 is formed in the rotor cover 23 in conformity to the outer shape of the permanent magnets 22, and the permanent magnets 22 are circumferentially pushed by the rotor cover 23. This restricts relative rotations of the rotor cover 23 and the permanent magnets 22 in the circumferential direction. Therefore, an increase in the number of processes can be suppressed in manufacturing the rotor 2 while stopping the rotation of the rotor cover 23.

In each of the above embodiments, the rotor manufacturing method uses the pressing members including a plurality of external collet segments (the first external collet segments 42, 142 and the second external collet segments 52) that are circumferentially separated from one another and lined up in a shape of a ring. In the process of forming the angular portion 27, the bulging portions 60 that swell radially outward are formed in the rotor cover 23 in such a manner that each bulging portion 60 is located between neighboring first external collet segments 42, 142.

With the foregoing configuration, formation of the bulging portions 60 suppresses an increase in radial stiffness, and thus the rotor cover 23 can be easily pressed radially inward. This enables formation of the angular portion 27 without the occurrence of breakage and cracks.

In the second embodiment, each first external collet segment 142 includes the contact portion 143 that comes into contact with external collet segments adjacent thereto, and the pressing portion 144 that is located more radially inward than the contact portion 143 is to press the rotor cover 23. At the inner side of the first external collet segments 142, the collet recesses 145 opposing the rotor cover 23 are formed by the pressing portions 144.

With the foregoing configuration, the bulging portions 60 are formed by pressing the first external collet segments 142 to the point where the first external collet segments 142 are in contact with one another, without controlling the amount of movement of the first external collet segments 142. In this way, the bulging portions 60 can be easily formed. Furthermore, reproducibility can be improved in forming the bulging portions 60.

In the second embodiment, the process of forming the angular portion 27 includes a process of pressing the bulging portions 60 radially inward while the inner circumference of the axial end of the rotor cover 23 is held by the plurality of second internal collet segments 53 that are circumferentially separated from one another via a gap smaller than the circumferential length of each bulging portion 60 at the radially inner side.

With the foregoing configuration, the angular portion 27 is formed while the inner circumference of the rotor cover 23 is held by the second internal collet segments 53, without the rotor cover 23 entering the gaps between the second internal collet segments 53. In this way, the angular portion 27 can be formed throughout the entire circumference of the rotor cover 23.

In the third embodiment, the process of forming the angular portion 27 includes a process of pressing the bulging portions 60 radially inward with the use of the second external collet segments 52 and the second internal collet segments 53 while a gap between neighboring second external collet segments 52 and a corresponding gap between neighboring second internal collet segments 53 oppose each other via the rotor cover 23.

With the foregoing configuration, the bulging portions 60 are pressed radially inward while being interposed between the second external collet segments 52 and the second internal collet segments 53. As a result, the occurrence of wrinkles is suppressed by holding forces exerted by the second external collet segments 52 and the second internal collet segments 53. Thus, the bulging portions 60 can be processed in the presence of few wrinkles.

In each of the above embodiments, the process of forming the angular portion 27 also forms the flange portion 28 extending radially inward from the angular portion 27, and the boss portion 29 projecting in the axial direction of the rotor core 21 from the radially inner side of the flange portion 28.

With the foregoing configuration, the formed boss portion 29 can reduce springback, as well as an axial gap between the rotor cover 23 and the rotor core 21. Therefore, the rotation of the rotor cover 23 can be stopped more reliably.

In each of the above embodiments, the rotor manufacturing method further includes a process of forming the protrusion 25c, which projects toward the inner side of the rotor cover 23, in at least one of end surfaces of the rotor cover 23 after the angular portion 27 has been formed.

With the foregoing configuration, the formed protrusion 25c enables the rotor core to be clamped between both end surfaces of the rotor cover 23. Therefore, the rotation of the rotor cover 23 can be stopped more reliably.

In each of the above embodiments, the rotor 2 includes: the rotor core 21, which is fixed to the shaft 1 in such a manner that the rotor core 21 is rotatable integrally with the shaft 1, and on which the permanent magnets 22 have been mounted throughout the circumferential direction; and the tubular rotor cover 23 that covers the outer circumference of the rotor core 21. The rotor cover 23 includes the angular portion 27 that is located at an open end of the rotor cover 23 and formed in conformity to the outer shape of the permanent magnets 22.

With the foregoing configuration, the angular portion 27 is formed in the rotor cover 23 in conformity to the outer shape of the permanent magnets 22, and the permanent magnets 22 are circumferentially pushed by the rotor cover 23. This restricts relative rotations of the rotor cover 23 and the permanent magnets 22 in the circumferential direction. Therefore, an increase in the number of processes can be suppressed in manufacturing the rotor 2 while stopping the rotation of the rotor cover 23.

In each of the above embodiments, the rotor cover 23 of the rotor 2 also includes the flange portion 28 extending radially inward from the angular portion 27, and the boss portion 29 projecting in the axial direction of the rotor core 21 from the radially inner side of the flange portion 28.

With the forgoing configuration, the formed boss portion 29 can reduce springback, as well as an axial gap between the rotor cover 23 and the rotor core 21. Therefore, the rotation of the rotor cover 23 can be stopped more reliably.

Embodiments of this invention were described above, but the above embodiments are merely examples of applications of this invention, and the technical scope of this invention is not limited to the specific constitutions of the above embodiments.

For example, in each of the above embodiments, the rotation of the rotor cover 23 can be stopped by the angular portion 27 that is formed in conformity to the outer shape of the permanent magnets. When the rotor core 21 is provided with the plurality of permanent magnets 22 that are circumferentially separated from one another, groove portions may be additionally formed in the angular portion 27 in such a manner that each groove portion represents a dent between circumferentially neighboring permanent magnets 22. Such groove portions are formed at the time of forming the angular portion 27, and function as detents that stop the rotation of the rotor cover 23 with respect to the rotor core 21. Therefore, the angular portion 27 with such groove portions can further stop the rotation of the rotor cover 23. Furthermore, the detent effect may be improved by separately forming a groove portion(s) in the tubular portion 24 of the rotor cover 23. Moreover, after forming the groove portion(s), axial grooves running between the permanent magnets 22 may be formed on the outer circumferential surface of the rotor cover 23.

Similarly to the above first embodiment, the second press process according to the above second embodiment arranges the second internal collet segments 53 in such a manner that the gaps between them oppose the recesses 61 at the inner side of the bulging portions 60. Alternatively, the second press process may arrange the second internal collet segments 53 in such a manner that the gaps between them are not aligned with the bulging portions 60 in the circumferential direction. That is to say, the above second and third embodiments may be combined.

In each of the above embodiments, the upper surface portion 26 of the rotor cover 23 extends radially inward from the angular portion 27 to cover and hide the permanent magnets 22. Alternatively, the upper surface portion 26 may extend to have the permanent magnets 22 partially exposed.

In each of the above embodiments, the upper surface portion 26 includes the boss portion 29 projecting in the axial direction of the rotor core 21 from the radially inner side of the flange portion 28. Alternatively, the boss portion 29 may not be formed, although it is desirable to form the boss portion 29 to reliably stop the rotation of the rotor cover 23.

In each of the above embodiments, the upper surface portion 26 is formed at one end of the rotor cover 23 having a shape of a tube with a bottom. Alternatively, the rotor core 21 may be inserted into a tubular rotor cover 23 that is not provided with the bottom portion 25, and then the upper surface portion 26 may be formed at both ends of the rotor cover 23.

In each of the above embodiments, in forming the upper surface portion 26 of the rotor cover 23, the external die 41 is arranged to surround an entire outer circumference of the tubular portion 24. Alternatively, the external die 41 may be arranged to surround a part of the outer circumference of the tubular portion 24, or may not be used.

In each of the above embodiments, the upper surface portion 26 is gradually formed through two processes, i.e., the first and second press processes. Alternatively, the upper surface portion 26 may be formed by pressing the open end of the rotor cover radially inward through three or more processes.

In each of the above embodiments, the upper surface portion 26 is formed with the use of the first external collet segments 42, 142, the second external collet segments 52, the first internal collet segments 43, and the second internal collet segments 53. Alternatively, the upper surface portion 26 may be formed only with the use of the first external collet segments 42, 142 and the second external collet segments 52, without using the first internal collet segments 43 and the second internal collet segments 53.

In each of the above embodiments, the rotor cover 23 is described to be made of non-magnetic stainless steel. Alternatively, the rotor cover 23 may be made of other non-magnetic metals, such as aluminum.

If the outer circumference of the rotor core 21 is simply covered with the rotor cover 23, the positions between the permanent magnets 22 cannot be checked from the outer side of the rotor cover 23. This makes it difficult to form axial grooves running between the permanent magnets 22 in a post-process. On the other hand, in each of the above embodiments, groove portions are formed between the permanent magnets 22, even after the rotor cover 23 has been mounted. This makes it possible to check the positions between the permanent magnets 22, and form axial grooves running between the permanent magnets 22 in a post-process. Such grooves formed in the post-process further reduces clearance between the rotor cover 23 and the permanent magnets 22, thereby stopping the rotation of the rotor cover 23 more reliably.

This application claims priority based on Japanese Patent Application No. 2014-220715 filed with the Japan Patent Office on Oct. 29, 2014, the entire contents of which are incorporated into this specification.

The invention claimed is:

1. A rotor manufacturing method for manufacturing a rotor including a rotor core, the rotor core being fixed to a rotation axis in such a manner that the rotor core is rotatable integrally with the rotation axis, and having a permanent magnet mounted thereon throughout a circumferential direction, the rotor manufacturing method comprising:
    covering an outer circumference of the rotor core with a tubular rotor cover; and
    forming an angular portion conforming to an outer shape of the permanent magnet by pressing an open end of the rotor cover radially inward with use of a pressing member, the open end of the rotor cover axially projecting from an end of the rotor core before being pressed, wherein
    the pressing member includes a plurality of external collet segments circumferentially separated from one another and lined up in a shape of a ring, and
    forming the angular portion causes a bulging portion swelling radially outward to be formed in the rotor cover between neighboring ones of the plurality of external collet segments.

2. The rotor manufacturing method according to claim 1, wherein each of the plurality of external collet segments includes:
    a contact portion coming into contact with external collet segments adjacent thereto among the plurality of external collet segments; and
    a pressing portion located more radially inward than the contact portion is to press the rotor cover, and
    at an inner side of the plurality of external collet segments, the pressing portions form collet recesses opposing the rotor cover.

3. The rotor manufacturing method according to claim 1, wherein forming the angular portion includes pressing the bulging portion radially inward with use of the plurality of external collet segments while an inner circumference of the open end of the rotor cover is held by a plurality of internal collet segments circumferentially separated from one another via a gap smaller than a circumferential length of the bulging portion at a radially inner side.

4. The rotor manufacturing method according to claim 1, wherein forming the angular portion includes pressing the bulging portion radially inward with use of the plurality of external collet segments and the plurality of internal collet segments while a gap between neighboring ones of the plurality of external collet segments and a corresponding gap between neighboring ones of the plurality of internal collet segments oppose each other via the rotor cover.

5. The rotor manufacturing method according to claim 1, wherein a flange portion and a boss portion are formed in forming the angular portion, the flange portion extends radially inward from the angular portion, and the boss portion projects in an axial direction of the rotor core from a radially inner side of the flange portion.

6. A rotor manufacturing method for manufacturing a rotor including a rotor core, the rotor core being fixed to a rotation axis in such a manner that the rotor core is rotatable integrally with the rotation axis, and having a permanent magnet mounted thereon throughout a circumferential direction, the rotor manufacturing method comprising;
    covering an outer circumference of the rotor core with a tubular rotor cover;
    forming an angular portion conforming to an outer shape of the permanent magnet by pressing an open end of the rotor cover radially inward with use of a pressing member, the open end of the rotor cover axially projecting from an end of the rotor core before being pressed; and
    forming a protrusion in at least one of end surfaces of the rotor cover after forming the angular portion, the protrusion projecting toward an inner side of the rotor cover.

7. The rotor manufacturing method according to claim 6, wherein a flange portion and a boss portion are formed in forming the angular portion, the flange portion extending radially inward from the angular portion, the boss portion projecting in an axial direction of the rotor core from a radially inner side of the flange portion.

8. A rotor, comprising:
    a rotor core fixed to a rotation axis in such a manner that the rotor core is rotatable integrally with the rotation axis, the rotor core having a permanent magnet mounted thereon throughout a circumferential direction; and
    a tubular rotor cover covering an outer circumference of the rotor core, wherein
    the rotor cover includes;
        an angular portion located at an open end of the rotor cover, the angular portion being formed in conformity to an outer shape of the permanent magnet, and
        a protrusion disposed in at least one of end surfaces of the rotor cover, the protrusions projecting toward an inner side of the rotor cover.

9. The rotor according to claim 8, wherein the rotor cover further includes:
    a flange portion extending radially inward from the angular portion; and
    a boss portion projecting in an axial direction of the rotor core from a radially inner side of the flange portion.

* * * * *